United States Patent

Nysen

[11] Patent Number: 6,114,971
[45] Date of Patent: Sep. 5, 2000

[54] FREQUENCY HOPPING SPREAD SPECTRUM PASSIVE ACOUSTIC WAVE IDENTIFICATION DEVICE

[75] Inventor: Paul A. Nysen, Sunnyvale, Calif.

[73] Assignee: X-Cyte, Inc., San Jose, Calif.

[21] Appl. No.: 08/914,282

[22] Filed: Aug. 18, 1997

[51] Int. Cl.[7] .................................................. H04Q 5/22
[52] U.S. Cl. ........................................................ 340/825.54
[58] Field of Search ......................... 340/825.54, 825.69, 340/825.72, 571, 572, 573, 541, 505; 342/42, 44

[56] References Cited

U.S. PATENT DOCUMENTS

| | | |
|---|---|---|
| 2,817,012 | 12/1957 | Kendall . |
| 3,025,524 | 3/1962 | Thies . |
| 3,209,350 | 9/1965 | Davis et al. . |
| 3,273,146 | 9/1966 | Hurwitz . |
| 3,513,470 | 5/1970 | Rabow . |
| 3,521,280 | 7/1970 | Janco et al. . |
| 3,600,710 | 8/1971 | Adler ............................ 333/72 |
| 3,665,480 | 5/1972 | Fassett .......................... 343/754 |
| 3,689,929 | 9/1972 | Moody ........................... 343/802 |
| 3,706,094 | 12/1972 | Cole et al. .................. 343/6.5 SS |
| 3,737,911 | 6/1973 | Sakuragi et al. ............ 343/6.5 SS |
| 3,755,803 | 8/1973 | Cole et al. ..................... 340/280 |
| 3,801,935 | 4/1974 | Mitchell ......................... 333/72 |
| 3,810,257 | 5/1974 | Jones et al. ................... 333/30 R |
| 3,845,420 | 10/1974 | Holland et al. ............... 333/30 R |
| 3,845,490 | 10/1974 | Manwarren et al. ............ 343/821 |
| 3,869,682 | 3/1975 | Heeks et al. ................. 332/11 R |
| 3,870,994 | 3/1975 | McCormick et al. .......... 343/6.5 R |
| 3,878,528 | 4/1975 | Majeau ........................ 343/6.5 SS |
| 3,898,592 | 8/1975 | Solie ............................. 333/72 |
| 3,909,838 | 9/1975 | Beyerlein ....................... 357/70 |
| 3,931,597 | 1/1976 | Cho et al. ..................... 333/30 R |
| 3,936,774 | 2/1976 | Mellon et al. ................. 333/30 R |
| 3,961,290 | 6/1976 | Moore .......................... 333/30 R |
| 3,981,011 | 9/1976 | Bell, III ...................... 343/6.5 LC |
| 4,003,073 | 1/1977 | Helda et al. .................... 357/70 |
| 4,023,167 | 5/1977 | Wahlstrom .................. 343/6.5 SS |
| 4,028,649 | 6/1977 | Komatsu et al. ................. 333/72 |
| 4,044,355 | 8/1977 | Edvardsson .................... 343/14 |
| 4,058,217 | 11/1977 | Vaughan et al. ............... 209/74 M |
| 4,059,831 | 11/1977 | Epstein ........................ 343/6.8 R |
| 4,069,472 | 1/1978 | Kamata et al. .............. 340/146.3 K |
| 4,072,915 | 2/1978 | Mitchell ......................... 333/72 |
| 4,096,477 | 6/1978 | Epstein et al. ................ 343/6.5 SS |
| 4,106,020 | 8/1978 | Johnson ......................... 343/14 |

(List continued on next page.)

FOREIGN PATENT DOCUMENTS

| | | |
|---|---|---|
| 1413486 | 12/1972 | Australia . |
| B6661181 | 1/1980 | Australia ................. G01K 11/22 |
| B3400184 | 10/1984 | Australia . |
| 2189788 | 9/1987 | Australia ................. G07C 5/00 |
| 8900470 | 11/1989 | Australia . |

(List continued on next page.)

OTHER PUBLICATIONS

Goruk, William; Optical Probing Measurements of Surface Wave Generation and Reflection in Interdigital Transducers on LiNbO$_3$; Nov. 1980; pp. 341–354.

(List continued on next page.)

Primary Examiner—Michael Horabik
Assistant Examiner—Anthony A. Asongwed
Attorney, Agent, or Firm—Milde, Hoffberg & Macklin, LLP

[57] ABSTRACT

A system and method for interrogating a passive acoustic transponder, producing a transponder signal having characteristic set of signal perturbations in response to an interrogation signal, comprising a signal generator, producing an interrogation signal having a plurality of differing frequencies; a receiver, for receiving the transponder signal; a mixer, for mixing the transponder signal with a signal corresponding to the interrogation signal, to produce a mixed output; an integrator, integrating the mixed output to define an integrated phase-response of the received transponder signal; and an analyzer, receiving a plurality of integrated phase-responses corresponding to the plurality of differing frequencies, for determining the characteristic set of signal perturbations of the passive acoustic transponder.

32 Claims, 12 Drawing Sheets

U.S. PATENT DOCUMENTS

| | | | |
|---|---|---|---|
| 4,110,653 | 8/1978 | Hartemann | 310/313 |
| 4,138,681 | 2/1979 | Davidson et al. | 343/702 |
| 4,141,712 | 2/1979 | Rogers | 65/36 |
| 4,143,340 | 3/1979 | Hunsinger | 333/151 |
| 4,151,525 | 4/1979 | Strauch et al. | 343/6.5 R |
| 4,155,056 | 5/1979 | Cross et al. | 333/195 |
| 4,166,258 | 8/1979 | Tseng | 333/195 |
| 4,180,815 | 12/1979 | Hill | 343/6.5 R |
| 4,201,964 | 5/1980 | Noro et al. | 333/151 |
| 4,213,104 | 7/1980 | Cullen et al. | 333/150 |
| 4,217,564 | 8/1980 | Autran | 333/152 |
| 4,234,666 | 11/1980 | Gursky | 428/573 |
| 4,241,352 | 12/1980 | Alspaugh et al. | 343/700 MS |
| 4,242,671 | 12/1980 | Plows | 340/572 |
| 4,242,685 | 12/1980 | Sanford | 343/770 |
| 4,259,673 | 3/1981 | Guretzky | 343/825 |
| 4,260,988 | 4/1981 | Yanagisawa et al. | 343/700 MS |
| 4,263,571 | 4/1981 | Kinoshita et al. | 333/194 |
| 4,263,595 | 4/1981 | Vogel | 343/6.5 SS |
| 4,267,534 | 5/1981 | Tanski | 333/153 |
| 4,288,343 | 9/1981 | Louderback | 252/408 |
| 4,288,689 | 9/1981 | Lemelson et al. | 235/435 |
| 4,297,701 | 10/1981 | Henriques | 343/6.5 LC |
| 4,307,356 | 12/1981 | Arai | 333/194 |
| 4,320,402 | 3/1982 | Bowen | 343/700 MS |
| 4,330,790 | 5/1982 | Burns | 357/70 |
| 4,331,740 | 5/1982 | Burns | 428/572 |
| 4,339,753 | 7/1982 | Mawhinney | 343/6.5 SS |
| 4,388,524 | 6/1983 | Walton | 235/380 |
| 4,400,702 | 8/1983 | Tanaka | 343/790 |
| 4,410,823 | 10/1983 | Miller et al. | 310/313 D |
| 4,422,055 | 12/1983 | Cullen et al. | 333/151 |
| 4,423,392 | 12/1983 | Wolfson | 333/116 |
| 4,434,383 | 2/1984 | Cho et al. | 310/313 R |
| 4,462,011 | 7/1984 | Ward | 333/154 |
| 4,477,813 | 10/1984 | Weiss | 343/700 MS |
| 4,480,150 | 10/1984 | Jones et al. | 174/52 FP |
| 4,484,160 | 11/1984 | Riha | 333/195 |
| 4,494,031 | 1/1985 | Barnes et al. | 310/313 B |
| 4,554,549 | 11/1985 | Fassett et al. | 343/700 MS |
| 4,589,422 | 5/1986 | James et al. | 128/804 |
| 4,604,623 | 8/1986 | Skeie | 343/6.8 R |
| 4,605,929 | 8/1986 | Skeie | 343/6.8 R |
| 4,620,191 | 10/1986 | Skeie | 342/51 |
| 4,623,890 | 11/1986 | Nysen | 342/44 |
| 4,625,184 | 11/1986 | Niitsuma et al. | 333/150 |
| 4,625,207 | 11/1986 | Skeie | 342/51 |
| 4,625,208 | 11/1986 | Skeie et al. | 342/51 |
| 4,642,640 | 2/1987 | Woolsey et al. | 342/42 |
| 4,644,384 | 2/1987 | Charoensakvirochana | 357/74 |
| 4,672,418 | 6/1987 | Moran et al. | 357/70 |
| 4,699,682 | 10/1987 | Takishima | 156/292 |
| 4,703,327 | 10/1987 | Rossetti et al. | 342/44 |
| 4,706,105 | 11/1987 | Masuda et al. | 357/74 |
| 4,724,443 | 2/1988 | Nysen | 343/700 MS |
| 4,725,841 | 2/1988 | Nysen et al. | 342/44 |
| 4,734,698 | 3/1988 | Nysen et al. | 342/44 |
| 4,737,789 | 4/1988 | Nysen | 342/51 |
| 4,737,790 | 4/1988 | Skeie et al. | 342/51 |
| 4,739,328 | 4/1988 | Koelle et al. | 372/44 |
| 4,745,401 | 5/1988 | Montean | 340/572 |
| 4,782,345 | 11/1988 | Landt | 343/727 |
| 4,786,907 | 11/1988 | Koelle | 342/51 |
| 4,800,392 | 1/1989 | Garay et al. | 343/700 MS |
| 4,816,839 | 3/1989 | Landt | 343/795 |
| 4,845,397 | 7/1989 | Herrick et al. | 310/348 |
| 4,853,705 | 8/1989 | Landt | 343/803 |
| 4,864,158 | 9/1989 | Koelle et al. | 307/231 |
| 4,888,591 | 12/1989 | Landt et al. | 342/44 |
| 4,912,471 | 3/1990 | Tyburski et al. | 342/42 |
| 4,931,664 | 6/1990 | Knoll | 307/10.3 |
| 4,933,588 | 6/1990 | Greer | 310/313 D |
| 4,951,057 | 8/1990 | Nagel | 342/51 |
| 4,999,636 | 3/1991 | Landt et al. | 342/90 |
| 5,019,815 | 5/1991 | Lemelson et al. | 340/933 |
| 5,027,107 | 6/1991 | Matsuno et al. | 340/572 |
| 5,030,807 | 7/1991 | Landt et al. | 235/375 |
| 5,055,659 | 10/1991 | Hendrick et al. | 235/439 |
| 5,095,240 | 3/1992 | Nysen et al. | 310/313 R |
| 5,144,313 | 9/1992 | Kirknes | 342/44 |
| 5,182,570 | 1/1993 | Nysen et al. | 343/795 |
| 5,654,693 | 8/1997 | Cocita | 340/572 |

FOREIGN PATENT DOCUMENTS

| | | |
|---|---|---|
| 9000043 | 2/1990 | Australia . |
| 1228911 | 11/1987 | Canada . |
| 1228912 | 11/1987 | Canada . |
| 0513007 | 11/1990 | European Pat. Off. . |
| 2521290 | 5/1975 | Germany . |
| 2524571 | 6/1975 | Germany . |
| 2604105 | 2/1976 | Germany . |
| 2813753 | 3/1978 | Germany . |
| 0089617 | 3/1983 | Germany . |
| 3438051 | 10/1984 | Germany . |
| 56-122215 | 9/1981 | Japan . |
| 56-153817 | 11/1981 | Japan . |
| 847909 | 6/1985 | South Africa . |
| 847910 | 6/1985 | South Africa . |
| 1298381 | 2/1969 | United Kingdom . |
| 2165411 | 10/1984 | United Kingdom . |
| 2165423 | 10/1984 | United Kingdom . |
| 2165425 | 10/1984 | United Kingdom . |
| 2142475 | 1/1985 | United Kingdom . |
| WO02485 | 11/1980 | WIPO . |

OTHER PUBLICATIONS

Williamson, R.C; Reflective Array Matched Filter For A 16–Pulse Radar Burst; pp. 1325–1329.

De Vries, Adrian; Reflection of a Surface Wave From Three Types of ID Transducers; pp. 280–285.

IEEE Transactions on Sonics and Ultrasonics; Jan. 1973; vol. SU–20, No. 1; pp 42, 187, 204.

Haydl, William; Surface Acoustic Wave Resonators.

Cross, Peter S; Surface–Acoustic–Wave Resonators.

Stocker, Helmut; Akustische Oberflachenwellen–Bauelemente.

Williamson, Richard; Reflection Grating Filters; Department of the Army, pp. 381–442.

Holland, Melvin, Practical Surface Acoustic Wave Devices; Proceedings of the IEEE, vol. 62, No. 5, May 1974, p 582–611.

Omnidirectional Antennas; Butter Worth & Co; Chapter 2; pp 25–33.

Keenan, Robert; Private Firm Profits From Electronic Tolls; May 1996; Wireless Systems Design; p. 24.

Technology A Generation Ahead Amtech Brochure, pp 1–8, Insert.

Allan, Roger; Wireless Transceiver with Micromachined Sensor Detects Both Tire Pressure and Temperature; Technology Advances; Electronic Design, Dec. 16, 1996.

Walker, Harold; VPSK Modulation Transmits Digital Audio at 15 b/s/Hz; Wireless Systems Design; Dec. 1996; pp 38–42.-

Grossmann, John, The Wiring of the Green; Inc. Technology, 1996; No. 4; pp 55–58.

A Spread Spectrum Chip for RIC Applications; Micron Communications Inc; Microwave Journal; Nov. 1996; pp 144–148.

Tuttle, John; Integrated Circuit Simplifies Design of RFID Systems; Microwaves & RF; Oct. 1996, pp. 103–109.

Guo, Yanpeng; If Transceiver Serves Digital Cellular/PCS; Microwaves & RF; Oct. 1996, pp 77–84.

Robinson, Gail; Impulse Radar Micropowered for Sensor Apps; EET; Jan. 20, 1997; pp 33–36.

Schreier, Paul; Technology Regs Dictate Multiple Decisions for Wireless Links; Personal Engineering; Feb. 1997; pp 29–39.

FREQUENCY HOPPING SPREAD SPECTRUM PASSIVE ACOUSTIC WAVE IDENTIFICATION DEVICE

FIELD OF THE INVENTION

The present invention relates to a method and apparatus for interrogating a passive acoustic identification device (transponder) using a frequent hopping spread spectrum interrogation signal, and more particularly to a system and method for analyzing a passive acoustic wave identification device response to a frequency-discontinuous interrogation signal.

BACKGROUND OF THE INVENTION

A known radio frequency passive acoustic transponder system produces individualized responses to an interrogation signal. The code space for these devices may be, for example, $2^{16}$ codes, or more, allowing a large number of transponders to be produced without code reuse. These devices provide a piezoelectric substrate on which an aluminum pattern is formed, for example b a typical microphotolithography process, with a minimum feature size of, for example, one micron.

The known transponder devices include a surface acoustic wave device, in which an identification code is provided as a characteristic time-domain delay (reflection) pattern in a retransmitted signal, in a system which generally requires that the signal emitted from an exciting antenna be non-stationary with respect to a signal received from the tag. This ensures that the reflected signal pattern is distinguished from the emitted signal in a plurality of states, allowing analysis of the various delay components within the device. In such a device, received RF energy is transduced onto a piezoelectric substrate as an acoustic wave with a first interdigital electrode system, from whence it travels through the substrate, interfacing with reflector, delay or resonant/frequency selective elements in the path of the wave, and a portion of the acoustic wave is ultimately received by the interdigital electrode system and retransmitted. These devices do not require a semiconductor memory nor external electrical energy storage system, e.g., battery or capacitor, to operate. The propagation velocity of an acoustic wave in a surface acoustic wave device is slow as compared to the free space propagation velocity of a radio wave. Thus, the time for transmission between the radio frequency interrogation system and the transponder is typically short as compared to the acoustic delay, so that rate of the interrogation frequency change is based on the delay characteristics within the transponder. The interrogation frequency thus changes sufficient so that a return signal having a minimum delay may be distinguished from the interrogation frequency, and so that all of the relevant delays are unambiguously received for analysis. The interrogation frequency thus should not return to the same frequency before a maximum delay period. Generally, such systems are interrogated with a pulse transmitter or chirp frequency system.

Systems for interrogating a passive transponder employing acoustic wave devices, carrying amplitude and/or phase-encoded information are disclosed in, for example, U.S. Pat. Nos. 4,059,831; 4,484,160; 4,604,623; 4,605,623; 4,605,929; 4,620,191; 4,623,890; 4,625,207; 4,625,208; 4,703,327; 4,724,443; 4,725,841; 4,734,698; 4,737,789; 4,737,790; 4,951,057; 5,095,240; and 5,182,570, expressly incorporated herein by reference. Other passive interrogator label systems are disclosed in the U.S. Pat. Nos. 3,273,146; 3,706,094; 3,755,803; and 4,058,217.

In its simplest form, the acoustic transponder systems disclosed in these patents include a radio frequency transmitter capable of transmitting RF pulses of electromagnetic energy. These pulses are received at the antenna of a passive transponder and applied to a piezoelectric "launch" transducer adapted to convert the electrical energy received from the antenna into acoustic wave energy in the piezoelectric material. Upon receipt of an electrical signal corresponding to the RF interrogation wave, an acoustic wave is generated within the piezoelectric material and transmitted along a defined acoustic path. This acoustic wave may be modified along its path, such as by reflection, attenuation, variable delay (phase shift), and interaction with other transducers or resonators.

When an acoustic wave pulse is reconverted into an electrical signal, it is supplied to an antenna on the transponder and transmitted as RF electromagnetic energy. This energy is received at a receiver and decoder, typically at or near the same location as the interrogating transmitter, and the information contained in this response to an interrogation signal is decoded. The tag typically has but a signal antenna, used for both receiving the interrogation pulse and emitting an information bearing signal. Designs are known, however, with separate receiving and transmitting antennas, which may be at the same frequency or harmonically related, and having the same or different polarization.

In systems of this general type, the information code associated with and which identifies the passive transponder is built into the transponder at the time that a layer of metallization is finally defined on the substrate of piezoelectric material. This metallization thus defines the antenna coupling, launch transducers, acoustic pathways and information code elements, e.g., reflectors. Thus, the information code in this case is non-volatile and permanent. The information is present in the return signal as a set of characteristic perturbations of the interrogation signal, such as a specific complex delay pattern and attenuation characteristics. In the case of a transponder tag having launch transducers and a variable pattern of reflective elements, the number of possible codes is $N \times 2^M$ where N is the number of acoustic waves launched by the transducers and M is the number of reflective element positions for each transducer. Thus, with four launch transducers each emitting two acoustic waves, and a potential set of eight variable reflective elements in each acoustic path, the number of differently coded transducers is 2048. Therefore, for a large number of potential codes, it is necessary to provide a large number of launch transducers and/or a large number of reflective elements. However, efficiency is lost with increasing complexity, and a large number of distinct acoustic waves reduces the signal strength of the signal encoding the information in each. Therefore, the transponder design is a tradeoff between device codespace complexity and efficiency.

The transponder tag thus typically includes a multiplicity of "signal conditioning elements", i.e., delay elements, reflectors, and/or amplitude modulators, which are coupled to receive the first signal form a transponder antenna. Each signal conditioning element provides an intermediate signal having a known delay and a known amplitude modification to the acoustic wave interacting with it. Even where the signal is split into multiple portions, it is advantageous to reradiate the signal through a signal antenna. Therefore, a single "signal combining element" coupled to the all of the acoustic waves, which have interacted with the signal conditioning elements, is provided for combining the intermediate signals to produce the radiated transponder signal. The radiated signal is thus a complex composite of all of the signal modifications, which may occur within the transponder, modulated on the interrogation wave.

In known passive acoustic transponder system, the transponder remains static over time, so that the encoded information is retrieved by a single interrogation cycle, representing the state of the tag, or more typically, obtained as an inherent temporal signature of an emitted signal due to internal time delays. In order to determine a transfer function of a passive transponder device, the interrogation cycle may include measurements of excitation of the transponder at a number of different frequencies. This technique allows a frequency domain analysis, rather than a time domain analysis of an impulse response of the transponder.

Typically, the interrogator transmits a fist signal having a first frequency that successively assumes a plurality of frequency values within a prescribed frequency range. This first frequency may, for example, be in the range of 905–925 MHz, referred to herein as the nominal 915 MHz band, a frequency band that is commonly available for such use. The response of the tag to excitation at any given frequency is distinguishable from the response at other frequencies, due to the comparative difference of the differing frequency and fixed time delays. Advantageously in a known system, the frequency changes over time, so that the received response of the tag, delayed due to the internal structures, is at a different frequency than the simultaneously emitted signal, thus reducing interference an facilitating a frequency domain analysis.

Preferably, the passive acoustic wave transponder tag includes at least one element having predetermined characteristics, which assist in synchronizing the receiver and allows for temperature compensation of the system. As the temperature changes, the piezoelectric substrate may expanded contract, altering the characteristic delays and other parameters of the tag. Variations in the transponder response due to changes in temperature thus result, in part, from the thermal expansion of the substrate material. Although propagation distances are small, an increase in temperature of only 20° C. can produce an increase in propagation time by the period of one entire cycle at a transponder frequency of about 915 MHz; correspondingly, a change of about 1° C. results in a relative phase change of about 18°. The acoustic wave is often a surface acoustic wave, although acoustic wave devices operating with various wave types are known.

The transponder is constructed such that $i^{th}$ delay time $t_i = T_0 + K\Delta T + \Delta V_i$, where K is a proportionality constant, $\Delta T$ is the nominal, known difference in delay time between the intermediate signals of two particular successive ones of the signal delay elements in the group, and $\Delta V_i$ is a modification factor due to inter-transponder variations, such as manufacturing variations. By measuring the quantities $\Delta T$ and $\Delta V_i$, it is possible, according to known techniques, to determine the expected delay time $t_i - T_0$ for each and every signal delay element from the known quantities K, $\Delta T$ and $\Delta V_i$. The manufacturing variations $\Delta V_i$ are comprised of a "mask" variation $\Delta M_i$ due to imperfections in the photolithographic mask; an "offset" variation $\Delta O_i$ which arises from the manufacturing process used to deposit the metal layer on the piezoelectric substrate; and a random variation $\Delta R_i$ which is completely unpredictable but usually neglectably small. Specific techniques are available for determining and compensating both the mask variations $\Delta M_i$ and the offset variations $\Delta O_i$.

This known chirp interrogation surface acoustic wave transponder system provides a number of advantages, including high signal-to-noise performance, and the fact that the output of the signal mixer-namely, the signal which contains the difference frequencies of the interrogating chirp signal and the transponder reply signal—may be transmitted over inexpensive, shielded, twisted-pair wires because these frequencies are, for example, typically in the audio range, for passive transducer systems. Furthermore, since the audio signal is not greatly attenuated or dispersed when transmitted over long distances, the signal processor may be located at a position quite remote from the signal mixer, or provided as a central processing site for multiple interrogator antennae.

Passive transponder encoding schemes include selective modification of interrogation signal transfer function H(s) and delay functions f(z). These functions therefore typically generate a return signal in the same band as the interrogation signal. Since the return signal is mixed with the interrogation signal, the difference between the two will generally define the information signal, along with possible interference and noise. By controlling the rate of change of the interrogation signal frequency with response to a maximum round trip propagation delay, including internal delay, as well as possible Doppler shift, the maximum bandwidth of the demodulated signal may be controlled. Thus, the known systems employ a chirp interrogation waveform which allows a relatively simple processing of limited bandwidth transponder signals.

Known impulse excitation systems require broadband transponder signal analysis, and thus cannot typically employ audio frequency analysis systems.

The term "tap" refers either to the physical point of connection on, or to the instant of time that energy is removed from a "tapped" delay line. In the case of a surface acoustic wave (SAW) device, the term "tap" refers to the mechanism for, or instant of time that acoustic energy in a piezoelectric substrate is reconverted into electrical energy.

A known surface acoustic wave passive interrogator label system, as described, for example, in U.S. Pat. Nos. 4,734,698; 4,737,790; 4,703,327; and 4,951,057, includes an interrogator comprising a voltage controlled oscillator 10 which produces a fist signal S1 at a radio frequency determined by a control voltage V supplied by a control unit 12. This signal S1 is amplified by a power amplifier 14 and applied to an antenna 16 for transmission to a transponder 20. The voltage controlled oscillator 10 may be replaced with other oscillator types.

In one known system, the signal S1 is received at the antenna 18 of the transponder 20 and passed to a signal transforming element 22. This signal transformer converts the first (interrogation) signal S1 into a second (replay) signal S2, encoded with an information pattern. The information pattern is encoded as a series of elements having characteristic delay periods $T_0$ and $\Delta T_1, \Delta T_2, \ldots \Delta T_N$. Two common types of systems exist. In a first, the delay periods correspond to physical delays in the propagation of the acoustic signal. After passing each successive delay, a portion of the signal $I_0, I_1, I_2 \ldots I_N$ is tapped off and supplied to a summing element. The resulting signal S2, which is the sum of the intermediate signals $I_0 \ldots I_N$, is fed back to a transponder tag antenna, which may be the same or different than the antenna which received the interrogation signal, for transmission to the interrogator/receiver antenna. In a second system, the delay periods correspond to the positions of reflective elements, which reflect portions of the acoustic wave back to the launch transducer, where they are converted back to an electrical signal and emitted by the transponder tag antenna. The signal S2 is passed either to the same antenna 18 or to a different antenna 24 for transmission back to the interrogator/receiver apparatus. This second signal S2 carries encoded information which, at a minimum, identifies the particular transponder 20.

The signal S2 is picked up by a receiving antenna 26. Both this second signal S2 and the first signal S1 (or respective signals derived from these two signals) are applied to a mixer (four quadrant multiplier) 30 to produce a third signal S3 containing frequencies which include both the sums and the differences of the frequencies contained in the signals S1 and S2. The signal S3 is passed to a signal process 32 which determines the amplitude $a_i$ and the respective phase $\phi_i$ of each frequency component $\phi_i$ among a set of frequency components ($\phi_0, \phi_1, \phi_2 \ldots$) in the signal S3. Each phase $\phi_i$ is determined with respect to the phase $\phi_0=0$ of the lowest frequency component $\phi_0$. The signal S3 may be intermittently supplied to the mixer by means of a switch, and indeed the signal processor may be time-division multiplexed to handle a plurality of S3 signals from different antennas.

The information determined by the signal processor 32 is passed to a computer system comprising, among other elements, a random access memory (RAM) 34 and a microprocessor 36. This computer system analyzes the frequency, amplitude and phase information and makes decisions based upon this information. For example, the computer system may determine the identification number of the interrogated transponder 20. This I.D. number and/or other decoded information is made available at an output 38.

The transponder serves as a signal transforming element 22, which comprises N+1 signal conditioning elements 40 and a signal combining element 42. The signal conditioning elements 40 are selectively provided to impart a different response code for different transponders, and which may involve separate intermediate signals $I_0, I_1 \ldots I_N$ within the transponder. Each signal conditioning element 40 comprises a known delay $T_i$ and a known amplitude modification $A_i$ (either attenuation or amplification). The respective delay $T_i$ and amplitude modification $A_i$ may be functions of the frequency of the received signal S1, or they may provide a constant delay and constant amplitude modification, respectively, independent of frequency. The time delay and amplitude modification may also have differing dependency on frequency. The order of the delay and amplitude modification elements may be reversed; that is, the amplitude modification elements $A_i$ may precede the delay elements $T_i$. Amplitude modification $A_i$ can also occur within the path $T_i$. The signals are combined in combining element 42 which combines these intermediate signals (e.g., by addition, multiplication or the like) to form the reply signal S2 and the combined signal emitted by the antenna 18.

In one known interrogation system embodiment, the voltage controlled oscillator 10 is controlled to produce a sinusoidal RF signal with a frequency that is swept in 128 equal discrete steps from 905 MHz to 925 MHz. Each frequency step is maintained for a period of 125 microseconds so that the entire frequency sweep is carried out in 16 milliseconds. Thereafter, the frequency is dropped back to 905 MHz in a relaxation period of 0.67 milliseconds. The stepwise frequency sweep 46 shown in FIG. 3B thus approximates the linear sweep 44 shown in FIG. 3A.

Assuming that the stepwise frequency sweep 44 approximates an average, linear frequency sweep or "chirp" 47, FIG. 3B illustrates how the transponder 20, with its known, discrete time delays $T_0, T_1 \ldots T_N$ produces the second (replay) signal 52 with distinct differences in frequency from the first (interrogation) signal 51. Assuming a round-trip, radiation transmission time of $t_0$, the total round-trip times between the moment of transmission of the first signal and the moments of reply of the second signal will be $t_0+T_0$, $t_0+T_1, \ldots t_0+T_N$, for the delays $T_{0N}, T \ldots, T_1$ respectively. Considering only the transponder delay $T_N$, at the time $t_R$ when the second (reply) signal is received at the antenna 26, the frequency 48 of this second signal will be $\Delta f_N$ less than the instantaneous frequency 47 of the first signal S1 transmitted by the antenna 16. Thus, if the first and second signals are mixed or "homodyned", this frequency difference $\Delta f_N$ will appear in the third signal as a beat frequency. Understandably, other beat frequencies will also result from the other delayed frequency spectra 49 resulting from the time delays $T_0, T_1 \ldots T_{N-1}$. Thus, in the case of a "chirp" waveform, the difference between the emitted and received waveform will generally be constant.

In mathematical terms, we assume that the phase of a transmitted interrogation signal is $\phi=2\pi f\tau$, where $\tau$ is the round-trip transmission time delay. For a ramped frequency $df/dt$ or f, we have: $2\pi f\tau=d\phi/dt=\omega$. $\omega$, the beat frequency, is thus determined by $\tau$ for a given ramped frequency or chirp f. In this case, the signal S3 may be analyzed by determining a frequency content of the S3 signal, for example by applying it to sixteen bandpass filters, each turned to a different frequency, $f_0, f_1 \ldots f_E, f_F$. The signal processor determines the amplitude and phase of the signals that pass through these respective filters. These amplitudes and phases contain the code or "signature" of the particular signal transformer 22 of the interrogated transponder 20. This signature may be analyzed and decoded is known manner.

In one embodiment of a passive transponder, shown in FIGS. 6 and 7, the internal circuit operates to convert the received signal S1 into an acoustic wave and then to reconvert the acoustic energy back into an electrical signal S2 for transmission via a dipole antenna 70, connected, and arranged adjacent a SAW device made of a substrate 72. More particularly, the signal transforming element of the transponder includes a substrate 72 of piezoelectric material such as a lithium niobate ($LiNbO_3$) crystal, which has a free surface acoustic wave propagation velocity of about 3488 meters/second. On the surface of this substrate is deposited a layer of metal, such as aluminum, forming a pattern which includes transducers and delay/reflective elements.

One transducer embodiment includes a pattern consisting of two bus bars 74 and 76 connected to the dipole antenna 70, a "launch" transducer 78 and a plurality of "tap" transducers 80. The bars 74 and 76 thus define a path of travel 82 for a surface acoustic wave which is generated by the launch transducer and propagates substantially linearly, reaching the tap transducers each in turn. The tap transducers convert the surface acoustic wave back into electrical energy which is collected and therefore summed by the bus bars 74 and 76. This electrical energy then activates the dipole antenna 70 and is converted into electromagnetic radiation for transmission as the signal S2.

The tap transducers 80 are provided at equally spaced intervals along the surface acoustic wave path 82, as shown in FIG. 6, and an informational code associated with the transponder is imparted by providing a selected number of "delay pads" 84 between the tap transducers. These delay pads, which are shown in detail in FIG. 7, are preferably made of the same material as, and deposited with, the bus bars 74, 76 and the transducers 78, 80. Each delay pad has a width sufficient to delay the propagation of the surface acoustic wave from one tap transducer 80 to the next by one quarter cycle or 90° with respect to an undelayed wave at the frequency of operation (in the 915 MHz band). By providing locations for three delay pads between successive tap transducers, the phase f of the surface acoustic wave received by a tap transducer may be controlled to provide four phase possibilities, zero pads=0°; one pad=90°; two pads=180°; and three pads=270°. The phase information $\phi_0$ (the phase of the signal picked up by the first tap transducer in line), and $\phi_1, \phi_2 \ldots \phi_N$ (the phases of the signals picked up by the successive tap transducers) is supplied to the combiner (summer) which, for example, comprises the bus bars 74 and 76. This phase information, which is transmitted as the signal S2 by the antenna 70, contains the informational code of the transponder.

As shown in FIG. 7, the three delay pads 84 between two tap transducers 80 are each of such a width L as to each provide a phase delay of 90° in the propagation of an acoustic wave from one tap transducer to the next as compared to the phase in the absence of such a delay pad. This width L is dependent upon the material of both the substrate and the delay pad itself as well as upon the thickness of the delay pad and the wavelength of the surface acoustic wave.

While a system of the type described above operates satisfactorily when the number of tap transducers does not exceed eight, the signal to noise ratio in the transponder reply signal is severely degraded as the number of tap transducer increases. This is because the tap transducers additionally act as launch transducers as well as partial reflectors of the surface acoustic wave so that an increase in the number of tap transducers results in a corresponding increase in spurious signals in the transponder replies. This limitation on the number of tap transducers places a limitation on the length of the informational code imparted in the transponder replies.

Spurious signals as well as insertion losses may be reduced in a passive transponder so that the informational code may be increased in size to any desired length, by providing one or more surface acoustic wave reflectors on the piezoelectric substrate in the path of travel of the surface acoustic wave, to reflect the acoustic waves back toward a transducer for reconversion into an electric signal.

A transducer 86 may thus be employed in conjunction with reflectors 88 and 90 in a unique configuration which replaces the aforementioned arrangement having a launch transducer 78 and tap transducers 80. In particular, the transducer 86 is constructed to convert electrical energy received at the terminals 92 and 94 into surface acoustic wave energy which propagates outward in opposite directions indicated by the arrows 96 and 98. The launch transducer is constructed in a well known manner with an inter-digital electrode assembly formed of individual electrode fingers arranged between and connected to the two bus bars 100 and 102. In the illustrated pattern, half the fingers are connected to the bus bar 100 and the other half are connected to the bus bar 102. Each electrode is connected to one or the other bus bar and extends toward a free end in the direction of the other bus bar. The distance between the centers of successive fingers is equal to $3\lambda/4$ where $\lambda$ is the center wavelength of the surface acoustic wave. Furthermore, as may be seen, the length of the active region between the ends of the electrodes connected to the bus bar 100 and the ends of the electrodes connected to the bus bar 102 is $K\lambda$, where K is a proportionality constant. Surface acoustic waves which travel outward from the transducer 86 in the directions 96 and 98 encounter and are reflected back by the reflectors 88 and 90. These reflectors comprise individual electrode fingers which extend between the bus bars 104 ad 106 on opposite sides. These electrodes are spaced from center to center, a distance $\lambda/2$ apart. The reflectors 88 and 90 serve to reflect nearly 100% of the surface acoustic wave energy back toward the transducer 86; that is, in the directions 108 and 110, respectively. Thus, after a pulse of surface acoustic wave energy is generated by the transducer 86, it is reflected back by the reflectors 88 and 90 and reconverted into an electrical signal by the transducer 86.

The configuration may also include one or more delay pads 112 which control the phase of the surface acoustic wave received back by the transducer 86. For a 90° phase delay (as compared to the phase of the received surface acoustic wave without a delay pad present) the delay pad should have a width equal to ½ the width of the typical delay pads because the surface acoustic wave will traverse the delay pads twice (i.e., in both directions).

A plurality of transducers 114 may be connected to common bus bars 116 and 118 which, in turn, are connected to the dipole antenna of the transponder. On opposite sides of this configuration and reflectors 120 and 122 which reflect surface acoustic waves back toward the transducers which launched them. Since the transducers 114 are connected in parallel, a radio frequency interrogation pulse is received by all the transducers essentially simultaneously. Consequently, these transducers simultaneously generate surface acoustic waves which are transmitted outward in both directions. Due to the particular configuration shown, the reflected surface acoustic waves are received at staggered intervals so that a single interrogation pulse produces a series of reply pulses after respective periods of delay.

Another embodiment of a passive transponder includes four transducers 124 which are connected electrically in series between bus bars 126. These transducers are interconnected by means of intermediate electrodes 128, the electrical circuit through each transducer being effected by capacitive coupling. When energized by an RF electrical signal, the transducers simultaneously produce surface acoustic waves which travel in four parallel paths 130.

To the right of the transducers 124 are four sets 132, 134, 136 and 138 of reflectors 140 arranged in the paths of travel 130 of the surface acoustic waves. In the example shown, three reflectors 140 are arranged in each set; however, the number of reflectors may be varied. If only a single reflector is provided in each of the positions 132, 134, 136 and 138, this reflector should be designed to reflect nearly 100% of the surface acoustic waves at the wavelength of these waves. If more than one reflector is provided, these reflectors should be designed to reflect only a portion of the acoustic wave energy. Where three reflectors are provided in each set, the first and second reflectors should allow some of the acoustic wave energy to pass beneath them to the third and last reflector in line. In this way, if a pulse of surface acoustic wave energy is generated by a transducer 124, some of it will be reflected by the first transducer, some by the second and some by the third reflector in line.

Another transponder system provides separate launch and receiving transducers. As may be seen, surface acoustic waves are generated by a launch transducer 166 and propagated in the direction indicated by the arrow 168. These surface acoustic waves pass beneath the receiving transducer 170 and continue on toward one or more reflectors 172 in the direction indicated by the arrow 174. This acoustic wave energy is reflected by the reflectors 172 and directed back toward the receiving transducer 170 in the direction indicated by the arrow 176. The launch and receiving transducers may be connected to separate dipole antennas. This may be advantageous in certain applications since the different antennas may receive and radiate energy in different directions, and this allows separate signal processing for received and transmitted RF energy.

FIG. 8, a single launch transducer (LT) 90 transmits surface acoustic waves in both directions to tap transducers (T) 92, 94, 96 and 98. As may be seen, the launch transducer 90 is slightly offset (to the left as illustrated in FIG. 8) so that the length of the transmission path 1 to the tap transducer 92 is shorter than the path 2 to the tap transducer 94. Similarly, the path 3 to the tap transducer 96 is shorter than the path 4 too the tap transducer 98. In particular, the various transducers are positioned such that the differences in propagation times between the pathways 1 and 2, 2 and 3, and 3 and 4 are all equal ($\Delta T$). The outputs of the tap transducers 92, 94, 96 and 98 may thus be summed to produce a second signal S2 of the type represented in FIG. 5.

FIG. 9 illustrates the same basic configuration as in FIG. 8 except that the launch transducer 100 operates also to reconvert the SAW energy into electrical energy to form the signal S2. Reflectors 102, 104, 106 and 108 serve to reflect the acoustic wave energy proceeding on paths 1, 2, 3 and 4, respectively, back toward the transducer 100. As in the configuration of FIG. 8, the differences in propagation times between successive pathways (i.e., between pathways 1 and 2, 2 and 3, and 3 and 4) are all equal ($\Delta T$).

In the embodiments of FIG. 8 and FIG. 9, surface acoustic waves traveling along pathways 3 and 4 must pass beneath transducers 92, 94 (FIG. 8) or reflectors 102, 104 (FIG. 9). Such an arrangement of successive, multiple tap transducers or reflectors in a pathway introduces unwanted reflections and spurious signals into the output signal S2, making subsequent signal processing more difficult. FIGS. 10 and 11 illustrate SAW device configurations, corresponding to FIGS. 8 and 9, respectively, in which plural launch transducers simultaneously receive and convert the signal S1 into SAW energy. With this arrangement the pathways, 1, 2, 3 and 4 are spatially separated so that the surface acoustic waves can travel on the surface of the substrate without passing beneath a reflector or transducer. Combinations in various ways of the configurations of FIGS. 8–11 are also known. FIG. 12 shows an embodiment which combines the principles illustrated in FIGS. 9 and 11. In this embodiment, two launch/receive transducers 110 and 112 simultaneously convert the interrogation signal S1 into surface acoustic waves which travel along pathways 1,2,3,4,5,6,7 and 8. The transducers 110 and 112 are positioned so that the propagation times along these pathways are staggered, from one pathway to the next, by a fixed amount $\Delta T$; that is, the propagation time along pathway 2 is $\Delta T$ longer than along pathway 1, the propagation time along pathway 3 is $\Delta T$ longer than along pathway 2, etc. It will be appreciated that an information code can be imparted to the second (reply) signal S2 by means of "delay pads" of the type illustrated in FIGS. 6 and 7. These delay pads may be inserted at appropriate places along the respective propagation pathways illustrated in FIGS. 8–12.

The embodiment of FIG. 13 comprises a substrate 220 of piezoelectric material, such as lithium niobate, on which is deposited a pattern of metallization essentially as shown. The metallization includes two bus bars 222 and 224 for the transmission of electrical energy to four launch transducers 226, 228, 230 and 232. These launch transducers are staggered, with respect to each other, with their leading edges separated by distances X, Y and Z, respectively, as shown. The distances X and Z are identical; however, the distance Y is larger than X and Z in order to provide temporal separation of the received signals corresponding to the respective signal paths. Further metallization includes four parallel rows of delay pads 234, 236, 238 and 240 and four parallel rows of reflectors 242, 244, 246 and 248. The two rows of reflectors 244 and 246 which are closest to the transducers are called the "front rows" whereas the more distant rows 242 and 248 are called the "back rows" of the transponder. The bus bars 222 and 224 include contact pads 250 and 252, respectively, to which are connected the associated poles 254 and 256 of a dipole antenna. These two poles are connected to the contact pads by contact elements or wires 258 and 260, represented in dashed lines.

The embodiment of FIG. 13 is similar, in principle, to the embodiment of FIG. 12. The provision of four transducers 226, 228, 230 and 232 and two rows of reflectors 242, 244, 246, and 248 on each side of the transducers results in a total of sixteen SAW pathways of different length and, therefore, sixteen "taps". These sixteen pathways (taps) are numbered 0, 1, 2 . . . D, E, F, as indicated by the reference number (letter) associated with the individual reflectors. Thus, pathway 0 extends from transducer 226 to reflector 0 and back again to transducer 226 as shown in FIG. 9. Pathway 1 extends from transducer 228 to reflector 1 and back again to transducer 228. The spatial difference in length between pathway 0 and pathway 1 is twice the distance X (the offset distance between transducers 226 and 228). This results in a temporal difference of $\Delta T$ in the propagation time of surface acoustic waves. Similarly, pathway 2 extends from transducer 226 to reflector 2 and back again to transducer 226. Pathway 3 extends from transducer 228 to reflector 3 and back to transducer 228. The distance X is chosen such that the temporal differences in the length of the pathway 2 with respect to that of pathway 1, and the length of the pathway 3 with respect to that of pathway 2 are also both equal to $\Delta T$. The remaining pathways 4, 5, 6, 7 . . . E, D, F are defined by the distances from the respective transducers launching the surface acoustic waves to the associated reflectors and back again. The distance Y is equal to substantially three times the distance X so that the differences in propagation times between pathway 3 and pathway 4 on one side of the device and pathway B and pathway C on the opposite side are both equal to $\Delta T$. With one exception, all of the temporal differences, from one pathway to the next successive pathway are equal to the same $\Delta T$. The SAW device is dimensioned so that $\Delta T$ nominally equals 100 nanoseconds. In order to avoid the possibility that multiple back and forth propagations along a shorter pathway (one of the pathways on the left side of the SAW device as seen in FIG. 13) appear as a single back and forth propagation along a longer pathway (on the right side of the device), the difference in propagation times along pathways 7 and 8 is made nominally equal to 150 nanoseconds.

FIG. 15 is a graph illustrating the ranges of amplitudes which are expected in the individual components of the second (reply) signal associated with the respective pathways or tap delays 0–F. As may be seen, the greatest signal amplitudes will be received from pathways having reflectors in their front rows; namely, pathways 0,1,4,5,8,9,C and D. the signals received from the pathways having reflectors in their back rows are somewhat attenuated due to reflections and interference by the front row reflectors. If any one of the amplitudes $a_i$ at one of the sixteen frequencies $f_i$ in the third signal falls outside its prescribed range, the decoded identification number for that transponder is rejected.

As indicated above, transponders of the type illustrated in FIGS. 6–13 are susceptible to so-called "manufacturing"

variations in response, due to manufacturing differences from transponder to transponder, as well as temperature variations in response due to variations in ambient temperature. Particularly the case where small differences in tap delays in the order of one SAW cycle period are measured to determine the encoded transponder identification number, these manufacturing and/or temperature variations can be in the order of magnitude of the informational signal.

As explained above, the transponder identification number contained in the second (reply) signal is determined by the presence or absence of delay pads in the respective SAW pathways. These delay pads make a slight adjustment to the propagation time in each pathway, thereby determining the phase of the surface acoustic wave at the instant of its reconversion into electrical energy at the end of its pathway. Accordingly, a fixed code (phase) is imparted to at least two pathways in the SAW device, and the propagation times for these pathways are used as a standard for the propagation times of all other pathways. Likewise, in a reflector-based acoustic device, a reflector may be provided at a predetermined location to produce a reference signal.

The mask variation $\Delta M_i$ for a given pathway, i.e., a variation in tap delay due to imperfections in the mask—will be the same for all transponders made from the same mask (typically, the mask for forming the transducers, reflectors and phase pads). The time variations $\Delta O_i$ is the so-called "offset" variation which is primarily due to variations in the interdigital finger line widths of a reflector in the front row through which the surface acoustic waves must pass to reach a reflector i in the back row. Variations in transducer finger line widths are already reflected in the initial pathway propagation time $T_O$. These variations are traceable to the manufacturing process (such as the mask exposure time) and are normally the same for all parallel front row reflectors on one side of a transponder substrate. The line widths may vary from one side of the substrate to the other due to lack of orthogonality in the mask exposure. Since the time variations $\Delta R_i$ are completely random from pathway to pathway and from transponder to transponder, it is not possible to compensate for these. If a random variation $\Delta R_i$ becomes too large, however, the transponder identification number reading will be rejected, since one of the amplitudes $a_i$ or phases $\phi_i$ will fall outside of the acceptable limits. In addition, variations due to temperature which are reflected in large changes in the propagation times $T_O$ and $\Delta T$ must also be compensated. These temperature variations are substantially (but not exactly) the same for each pathway.

The three types of variations identified above-namely, temperature, mask and offset variations, are compensated in known systems as follows: Temperature variations are compensated by determining the times $T_O$ and $\Delta T$ from two successive pathways i and j to provide a first temperature estimate, and then compensating small, second order variations by averaging the propagation times of the four front row pathway pairs (pathways 0 and 1, 4 and 5, 8 and 9 and C and D). The variation $\Delta M$, which relates to the mask, will be the same for all transponders made from the same mask. Consequently, this variation may be isolated and compensated for by determining the amplitudes $a_i$ and phases $\phi_i$ for a large number of transponders, and thereafter determining statistically the acceptable limits for these parameters. By way of illustration, the amplitudes $a_i$ from different transponders made from the same mask for each frequency $f_i$ may be plotted on a graph such as that shown in FIG. 15 to determine their statistical distribution. The acceptable limits of amplitude may then be determined for each frequency from this statistical distribution. FIG. 15 shows one such distribution curve 170 of amplitudes for the frequency 2.45 kHz (pathway F). Variations in the phases $\phi_i$ of different transponders traceable to the mask are compensated in a similar manner by adjusting the center phases (nominally 0°, 90°, 180° and 270°) and the phase tolerances (nominally +/−30° about each center phase) for each "phase bin". After the initial compensation for mask variations $\Delta M$, all subsequent masks used to manufacture transponders may be adjusted sa as to match the imperfections in the original mask. The mask variations $\Delta M$ are therefore caused to remain identical for all transponders used in a given system. Finally, offset variations $\Delta O$, which are traceable to manufacturing process variations, are compensated by determining $\Delta O_F$ and using this value as a standard to eliminate the effect of offset in all the "back row" pathways; i.e., pathways 2,3,6,7,A,B and E.

The entire process of compensation is illustrated in the flow chart of FIG. 16. As is indicated there, the first step is to calculate the amplitude $a_i$ and phase $\phi_i$ for each audio frequency $\phi_i$ (block 180). Thereafter, the sixteen amplitudes are compared against their acceptable limits (block 182). As shown in FIG. 15, these limits may be different for each amplitude. If one or more amplitudes fall outside the acceptable limits, the transponder reading is immediately rejected. If the amplitudes are acceptable, the phase differences $\phi_{ij}$ are calculated (block 184) and the temperature compensation calculation is performed to determine the best value for $\Delta T$ (block 186). Thereafter, the offset compensation calculation is performed (block 188) and the phases for the pathways 2,3,6,7,A,B and E are adjusted. Finally, an attempt is made to place each of the pre-encoded phases into one of the four phase bins (block 190). If all such phases fall within a bin, the transponder identification number is determined; if not, the transponder reading is rejected.

SUMMARY AND OBJECTS OF THE INVENTION

According to the present invention, the chirp (successive incrementally varying) interrogation signal is replaced by a frequency hopping spread spectrum signal. In this case, the transponder response signal also represents a frequency hopping signal, having a bandwidth of about the entire width of the interrogation band, e.g., about 20 MHz. The signal analysis is also complicated by the "out of order" excitation sequence as compared to a chirp waveform. However, according to the present invention, the frequency hopping sequence is demodulated to baseband, and the random excitation order accounted for.

The frequency hopping interrogation signal is generated by a digitally controlled oscillator to produce a "random" pattern of frequencies. The digitally controlled oscillator is preferably a voltage controlled oscillator with a digital control input. The duration of each hop is longer than the longest delay in a transponder as well as the travel delay. There are at lest the same number of hops as there are delay taps, and preferably there are a larger number. For example, with 16 delay taps, there are at least 16 excitation frequencies, and more preferably 128 frequencies, which allows more robust operation. Advantageously, the pseudo-random sequence of the entire sequence of frequencies includes suitable subsets of excitation frequencies, allowing preliminary processing to commence prior to completion of an entire sequence. The pseudorandom sequence may repeat after each set, or have extended pseudorandom properties. The properties of interrogation transmitter preferably spread the power of the interrogation wave evenly across the band over time, to reduce interference with neighboring devices, and to potentially avoid functional interference from neighboring devices. Thus, since the pseudorandom sequence includes a set of excitation frequencies larger than is needed, interference on one or more particular excitation frequencies may be tolerated. Government regulatory agencies, such as the Federal Communications Commission (FCC) provide rules, regulations or guidelines as to what types of frequency hopping emissions are acceptable. The present system, therefore, accommodates the permissible schemes. As used herein, a "channel" refers to a particular nominal frequency within the band of the interrogation signal.

Since the acoustic wave transponder device is passive, the order of excitation frequencies is accounted for in the analysis, to associate the received signal with the corresponding excitation frequency. Since the signals are linearly additive and the filters may be highly selective, multiple channels may be present simultaneously, although a multichannel decoder (or multiple repetitions of a channel sequence) would be required to analyze the signal. Thus, known acoustic wave transponder devices may be used with the present invention.

The receiver mixes the interrogation signal, or a representation thereof, e.g., delayed, with the received transponder signal, which results in a near baseband signal, with a series of transients. These transients represent the signals from individual tap delays, which each have a relative phase and amplitude with respect to the representation of the interrogation signal. Since the transponder signal is demodulated to baseband, the signal from the demodulator includes a D.C. component as well as bursts of high frequency energy corresponding to the transients produced by the delay taps after a frequency hop. The demodulator output is then low pass filtered, for example less than about 10 kHz, to filter the bursts and high frequency components. This low pass filter acts as an integrator. The resulting signal is a D.C. signal, from homodyne filtering of the interrogation signal with the transponder signal, at the same frequency, with an amplitude related to the average phase relation of the signals entering the mixer. This amplitude is determined, for example every 125 $\mu$S (S kHz), with frequency hops occurring at this same rate. Because of the differences in the transponder signal due to the changes in frequency, the phase at each frequency hop provides a datapoint for analyzing the various delays within the transponder. For a transponder with 16 potential taps, the response must be measured at at least 16 frequencies. In practice, at least 32 frequencies, and more preferably 128 frequencies are employed. Since a minimum of 16 measurements must be made to analyze the simultaneous equations representing the tap arrangement of the transponder, processing may commence with partial data. However, a minimum set of measurements may yield unreliable data, so a larger set is preferably employed. The thus obtained sets of amplitudes at each interrogation frequency contain the code or "signature" of the particular signal transformer of the interrogated transponder. This signature may be analyzed and decoded using simultaneous equation solving techniques is known manner.

In performing an analysis of the transponder signal, a number of compensations and corrections may be made. For example, the round trip signal delay may be normalized, yielding an estimate of distance by a time of arrival technique. Likewise, any Doppler shift in the signal may be determined and compensated, allowing an indication of relative speed. These corrections may be implemented by altering the baseband demodulation to compensate, or by predistorting the interrogation wave as desired.

As noted above, there are a number of potential causes for variations from the nominal delay periods of a transponder, including temperature changes, mask variations, manufacturing variations and random variations. Prior art chirp interrogation systems which employed frequency domain transformations thus compensated for these factors by adjusting the boundaries of frequency bins. According to the present invention, these compensations are made in evaluating the simultaneous equations which represent the individual delays based on the sets of received amplitudes of the demodulate signals. Since these techniques are closely corresponding, the known techniques may be applied to the delay data produced by the present invention. Thus, the actual individual delays are determined based on the sets of equations, and then interpreted based on the compensation factors.

It is therefore an object of the present invention to provide a method for analyzing a frequency hopping spread spectrum interrogated passive acoustic transponder comprising the steps of receiving a transponder signal, demodulating the transponder signal with a representation of the interrogation signal, integrating the demodulated transponder signal after a hop over an integration period shorter than a frequency hopping period, determining an amplitude of the demodulated signal over a plurality of frequency hops, and analyzing the determined amplitudes to determine a set of component delays within the transponder.

It is also an object of the invention to analyze a set of steady state responses, at differing frequencies, of an acoustic transponder.

It is a further object according to the present invention to provide a passive acoustic transponder interrogation system capable of operating with known tap-delay acoustic transponder devices, while operating with a spread spectrum interrogation signal, e.g., as permissible under FCC regulations. The present invention also gains the known advantages of spread spectrum communications.

It is another object of the invention to provide a system and method for interrogating a passive acoustic transponder, producing a transponder signal having characteristic set of signal perturbations in response to an interrogation signal, comprising a signal generator, producing an interrogation signal having a plurality of differing frequencies; a receiver, for receiving the transponder signal; a mixer, for mixing the transponder signal with a signal corresponding to the interrogation signal, to produce a mixed output; an integrator, integrating the mixed output to define an integrated phase-response of the received transponder signal; and an analyzer, receiving a plurality of integrated phase-responses corresponding to the plurality of differing frequencies, for determining the characteristic set of signal perturbations of the passive acoustic transponder.

It is also an object of the invention to provide an apparatus and method for identifying passive acoustic transponder or an object associated therewith, comprising placing a passive acoustic transponder in proximity to the object, the transponder having a set of characteristic signal perturbations selected from a signal perturbation space having a plurality of degrees of freedom, and producing a perturbed signal in response to an interrogation; interrogating the passive acoustic transponder with a frequency hopping spread spectrum signal, having a sequence of a plurality of different frequencies, and a dwell period; receiving and demodulating the perturbed signal based on a representation of the frequency hopping spread spectrum signal; determining an average phase of the demodulated perturbed signal during a plurality of dwell periods; and analyzing the average phase from the plurality of dwell periods to determine the values of the plurality of degrees of freedom. Preferably, a plurality of passive acoustic transponders are provided, with a database storing an association of each passive acoustic transponder with values identifying the values of the plurality of degrees of freedom and the identity of the associated object, with the identity of the transponder or object retrieved from the database based on the determined values of the plurality of degrees of freedom.

The characteristic set of signal perturbations may include an acoustic reflection pattern, a set of phase shifts, resonances, and/or amplitude attenuation.

The interrogation signal preferably has a frequency band having a bandwidth of less than about 5% and having a center frequency in the range of between about 300 MHz to about 30 GHz, and more preferably a frequency in a band between about 800 MHz and 1.3 GHz and having a bandwidth of between about 1–3%. the interrogation signal may be, for example, a frequency hopping spread spectrum signal, but may also have a stepwise chirp or other waveform. Thus, the sequence of frequency hops may be random, pseudorandom (repeating sequence), or regular. The interrogation signal may produce the plurality of differing frequencies individually, or a plurality of frequencies concurrently. In the latter case, typically a multiplexer or parallel processing path (a plurality of mixers) would be necessary, each mixing a different frequency component to produce a demodulated signal.

The characteristic set of signal perturbations includes a pattern selected from a signal perturbation space having a plurality of degrees of freedom, the interrogation signal having a number of the plurality of differing frequencies no less than the number of degrees of freedom. There are preferably at least two times the number of differing frequencies as there are degrees of freedom, and, for example, 8 to 16 times the number of differing frequencies in a set of frequency hops is a suitable range. The differing frequencies are preferably spread about evenly across a band. The interrogation signal frequencies are preferably generated with a digitally controlled oscillator. In order to better correlate the interrogation signal with the transponder signal, the representation of the interrogation signal fed to the mixer may be delayed with respect to the interrogation signal.

The mixer preferably serves as a homodyne phase detector, mixing the transponder signal with a signal corresponding the interrogation signal to produce, in a steady state condition, a signal whose amplitude corresponds to a relative phase difference between the transponder signal and the signal corresponding to the interrogation signal. The mixer is preferably a double balanced mixer.

The integrator may be a low pass filter, preferably having at least two poles in its transfer function, but may also be a complex structure, such as an active integrator over a predetermined timeperiod. The integrated phase-response is preferably represented as a scalar value for each differing frequency of the interrogation signal.

In one embodiment, the integrator interrogation signal has a plurality of successive states, each state having a predetermined period, the integrator comprising a low pass filter having a main time constant of less than about 25% of the period. For example, the characteristic set of signal perturbations of the transponder has a maximum significant timeconstant of less than about 5 $\mu S$ and comprises a pattern selected from a signal perturbation space having about 16 degrees of freedom, the transponder integrator interrogation signal being a pseudorandom sequence frequency hopping signal having abut 128 successive different frequencies before repetition, each state having a predetermined period of about 125 $\mu S$.

The interrogation signal preferably comprises a frequency hopping spread spectrum signal having a dwell period, the characteristic set of signal perturbations of the transponder having a maximum significant timeconstant of less than about 10% of the dwell period, the integrator being a low pass filter having a cutoff frequency of less than the reciprocal of the maximum significant timeconstant of the transponder.

The analyzer preferably evaluates a set of simultaneous equations relating the integrated phase-responses to the characteristic set of signal perturbations of the passive acoustic transponder, the characteristic set of signal perturbations comprises a pattern selected from a signal perturbation space having a plurality of degrees of freedom, the interrogation signal having a number of the plurality of differing frequencies no less than the number of degrees of freedom, the analyzer solving simultaneous equations for evaluating the degrees of freedom, the analyzer compensating the evaluated degrees of freedom for predetermined variances, evaluating each integrated phase-response for consistency with a set of remaining integrated phase responses, and outputting a compensated, self-consistent data set corresponding to the evaluated degrees of freedom.

These and other objects will become apparent from a review of the detailed description of the preferred embodiments.

BRIEF DESCRIPTION OF THE DRAWINGS

FIGS. 19A1, 19A2 and 19B are a schematic drawings of a single pole R-C integrator, a double pole R-C integratory, and a switched integrator.

DETAILED DESCRIPTION OF THE PREFERRED EMBODIMENTS

Figure 1:
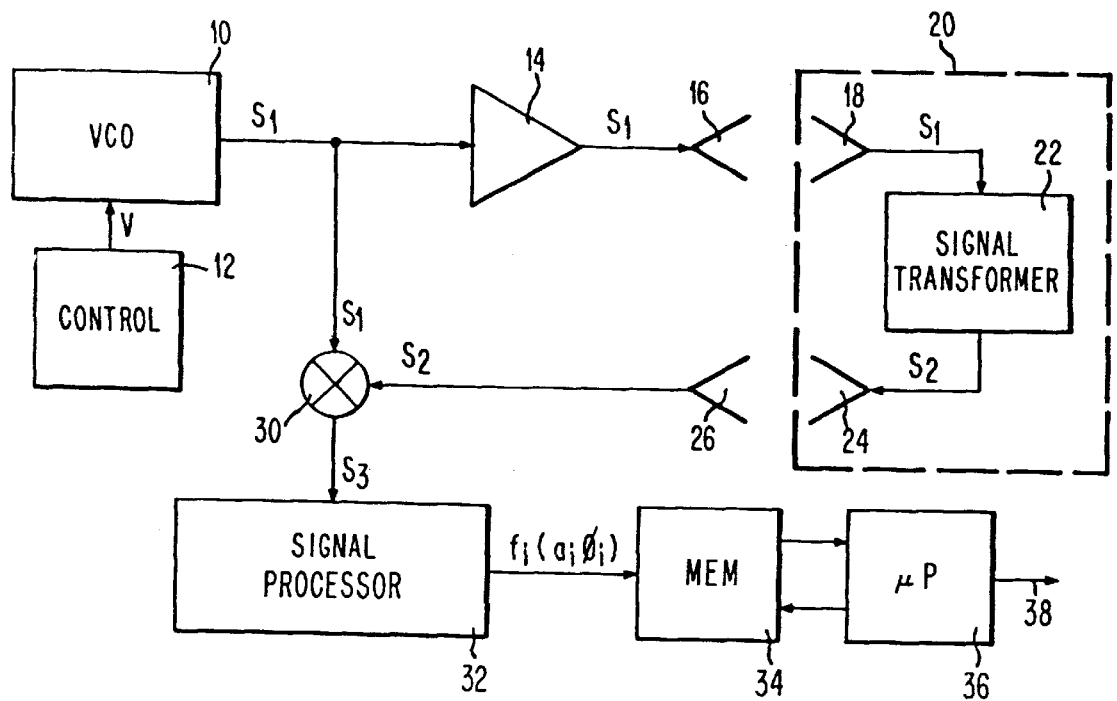
FIG. 1 is a block diagram of a known passive interrogator label system.

The preferred embodiments of the present invention will now be described with reference to the drawings. Identical elements in the various figures are designated with the same reference numerals.

Figure 13:
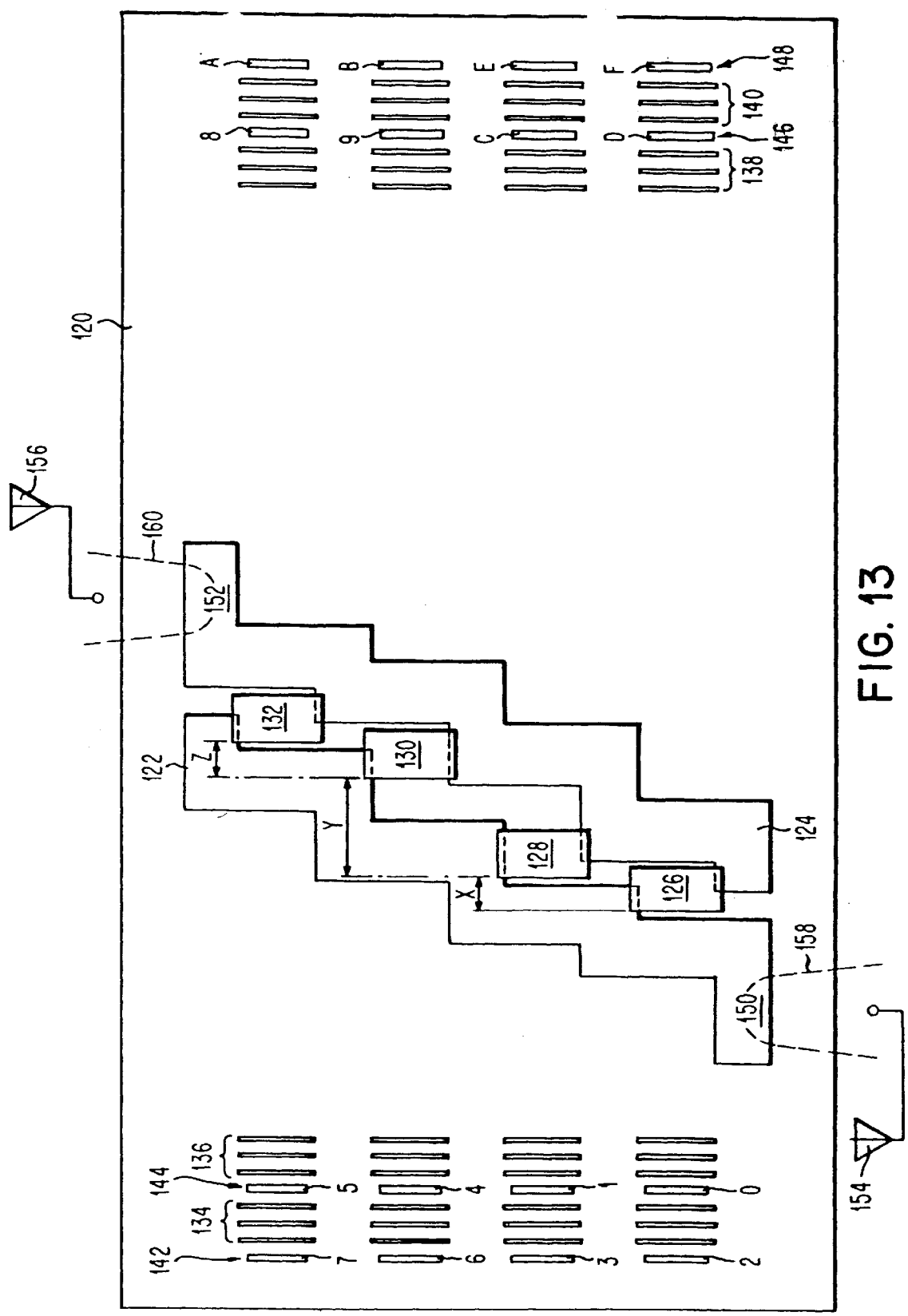
FIG. 13 is a plan view, in enlarged scale, of a seventh configuration of the transponder of FIG. 5.
Figure 14:
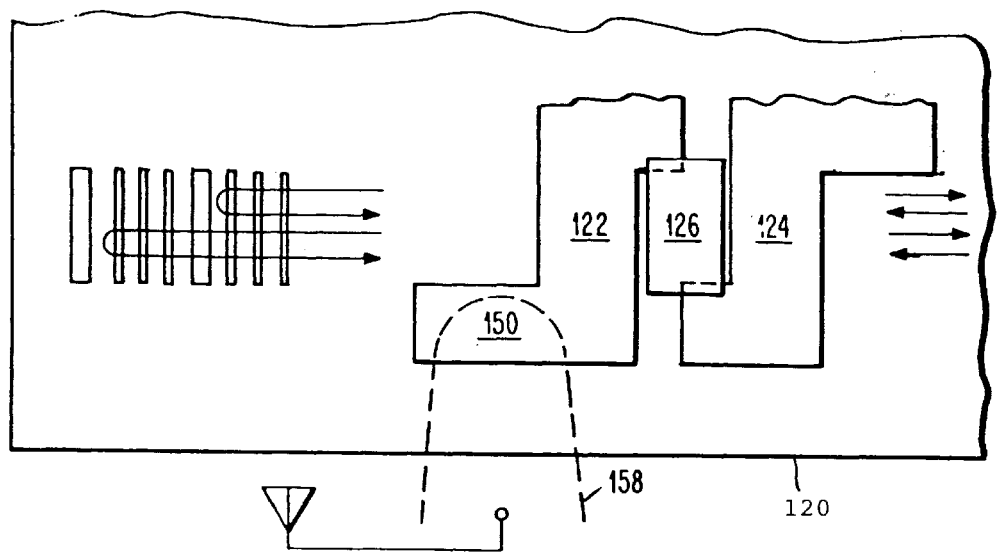
FIG. 14 is a plan view, in greatly enlarged scale, of a portion of the transponder configuration shown in FIG. 13.
Figure 15:
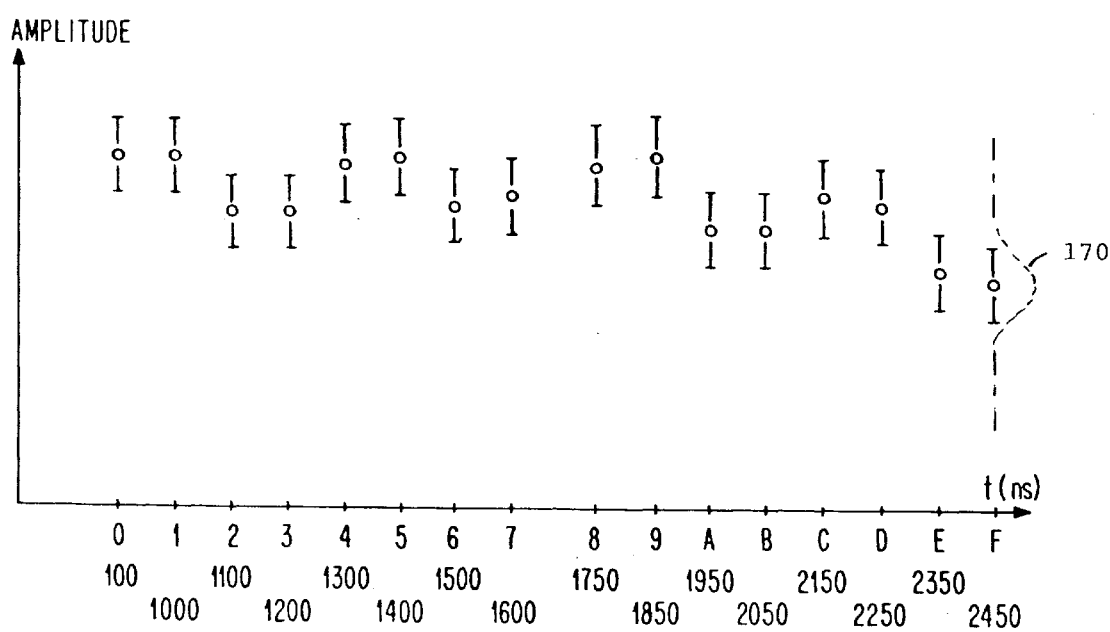
FIG. 15 is a diagram showing the respective time delays of the different SAW pathways in the transponder of FIG. 13.

An interrogation system according to the present invention is provided which employs a frequency hopping spread spectrum signal having a pseudorandom sequence which excites each of a set of approximately evenly spaced frequencies once during each repetition 240. The interrogation signal occupies a band of approximately 20 MHz centered at 915 MHz. The band is divided into 128 discrete frequencies, each of which is maintained for about 125 $\mu$S before hopping. The interrogation signal is generated by a digitally controlled oscillator 200, including a phase locked loop with voltage controlled amplifier. The sequence is generated by a sequence generator 202 to evenly spread energy through the band, without concentrating the wave energy in a narrow range for an extended period, so that a sequence is employed which optimizes the hops. Such sequences are known in th art, and the sequence generator 202 may be provided as a generator based on a lookup table or pseudorandom sequence generator. The transponder device 204 for which the system is designed has 16 degrees of freedom in its code space, generated in accordance with the embodiment of FIG. 13 by four bidirectional transducers, each wave having two sets of elements to interact with. Thus, the interrogator system analyzer 212 must resolve the 16 degrees of freedom in order to identify the transponder 204. In order to resolve these degrees of freedom, at least 16 distinct conditions must be applied to the transponder 204, producing a response which allows solution of the simultaneous equations. Since at lest 16 conditions, in this case different frequencies, are required, the larger available number allows robustness to interference and increased accuracy.

A microprocessor, not shown in the figures, is provided to control the system, generating the control signals for the digitally controlled oscillator signal generator 200. It is understood that the various functions may be integrated into common circuits, such as analog application specific integrated circuits (ASICs), digital ASICs, and/or mixed signal ASICs.

Further, since only 16 discrete excitation parameters are required, of the 128 available, the analysis in the analyzer 212 may proceed based on an incomplete data set. Further, because of thus flexibility, the frequency hopping sequence from the sequence generator 202 need not repeat or excite each frequency at the minimum rate, so long as the analyzer 212, to be described later, is provided with data identifying the excitation condition, i.e., an information path from the sequence generator. The analyzer 212 ultimately outputs a set of characteristics 214, which identify the transponder 204.

The receiver 216 includes an antenna and amplifier, which receives 242 the modified interrogation signal from the transponder 204. This signal modified interrogation is normalized in amplitude by an automatic gain control, and, for example, may be limited, since it is the phase relationships within the signal which are most important. The amplifier and optional limiter are well known in the art and are not shown in the drawing. The modified interrogation signal is mixed 244 in a demodulator 208 with a representation of the interrogation signal 218. The demodulator 208 is a double balanced mixer, operating at up to at least 1 GHz. The representation of the interrogation signal 218 may be the signal itself, or the signal delayed by a delay element 206, or an independently generated signal. The purpose of this mixer 208 is to translate the frequency of the signal to baseband, but more importantly to homodyne detect the relative phase of the interrogation signal and the transponder signal. Where the signals are in phase, the output of the mixer 208 is maximal, and decreases as the phases reach quadrature, turning negative as the signals move completely out of phase. Due to the composite nature of the transponder signal, being the superposition of the modifications in each acoustic path in the transponder device, as each component of the wave is initially received after a frequency hop, the relative phase will change. After the transient response has abated, the relative phase will be static until the next hop.

Figure 2:
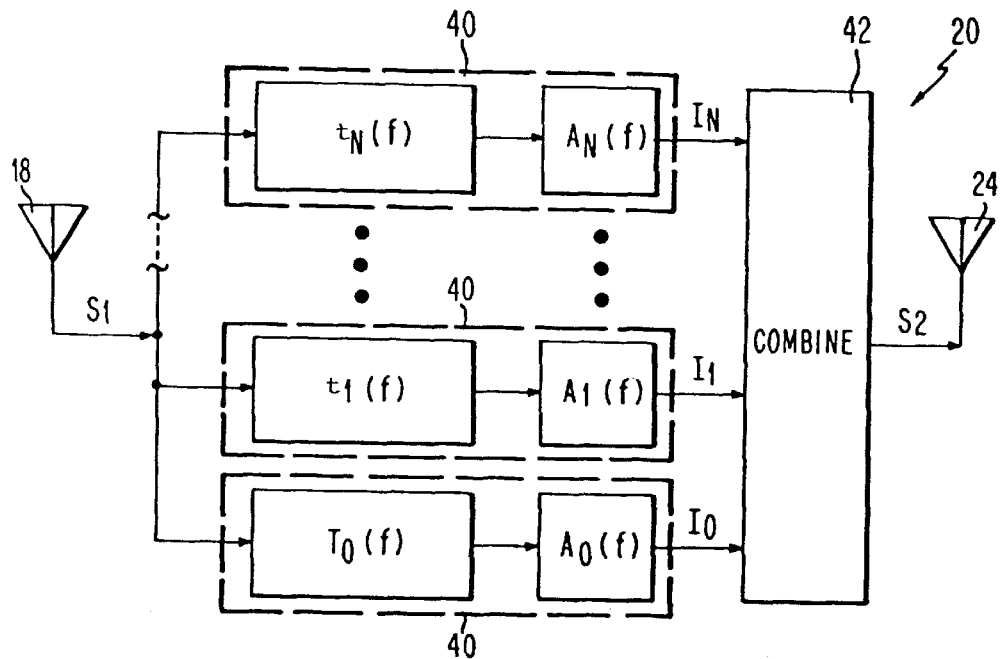
FIG. 2 is a block diagram of a transponder or "label" used in the system of FIG. 1.
Figure 3A:
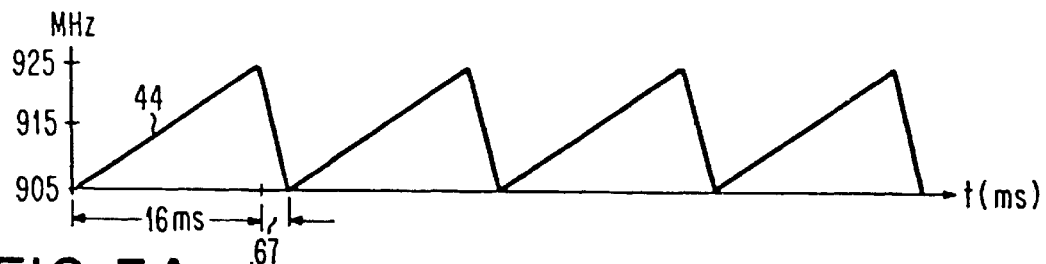
FIGS. 3A and 3B are time diagrams, drawn to different scales, of the radio frequencies contained in the interrogation and reply signals transmitted with the system of FIG. 1.
Figure 3B:
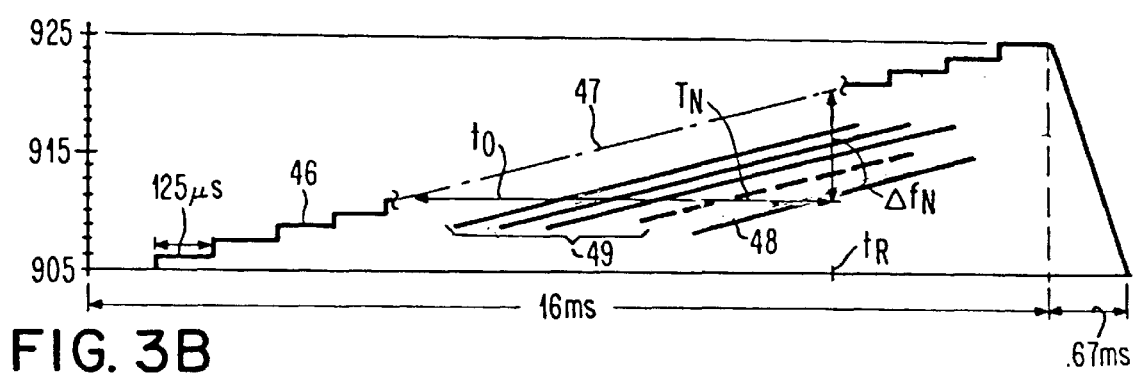
Figure 4:
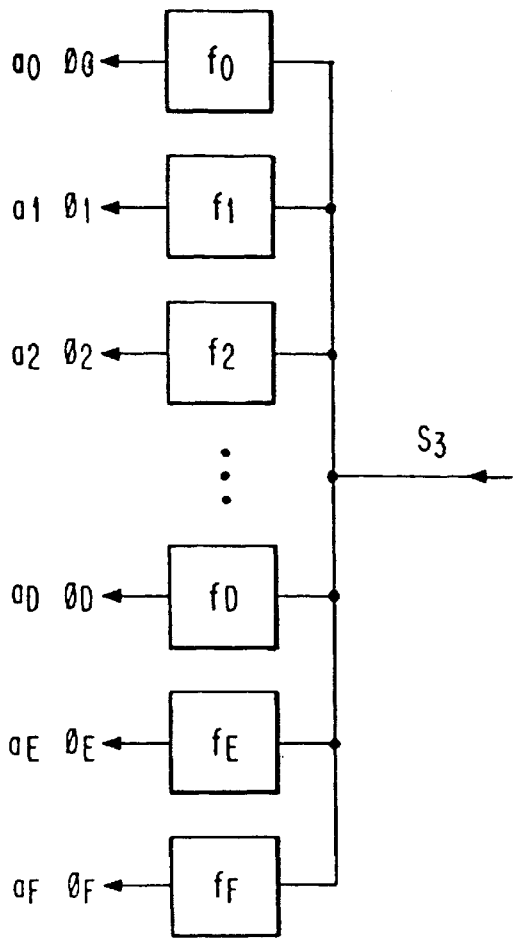
FIG. 4 is a block diagram illustrating the decoding process carried out by the signal processor in the system of FIG. 1.
Figure 5:
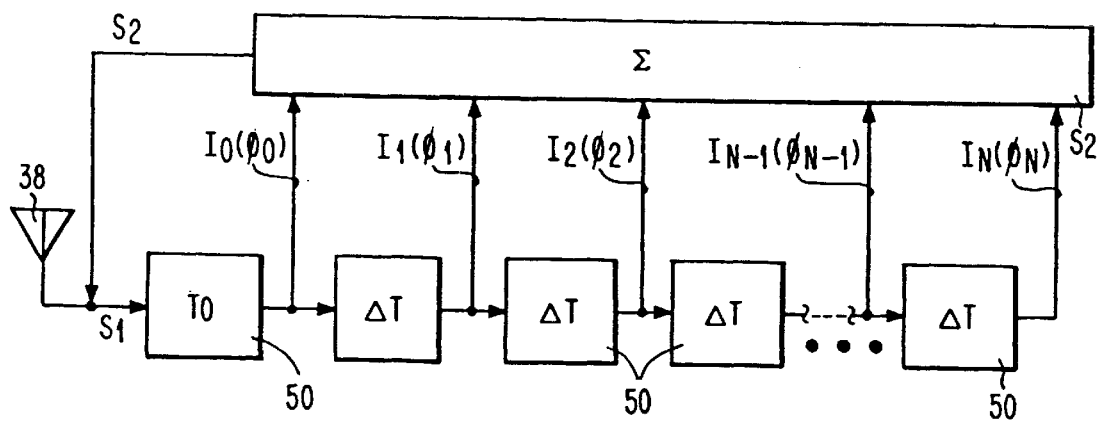
FIG. 5 is a block signal diagram of a passive transponder which may be used with the system of FIG. 1.
Figure 6:
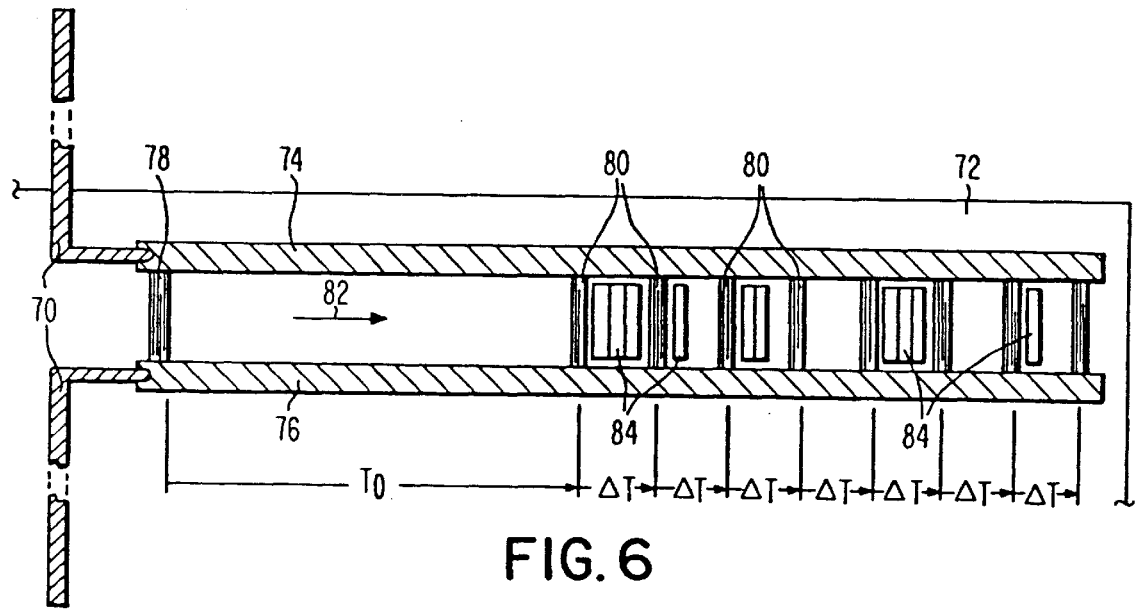
FIG. 6 is a plan view, in enlarged scale, of a first configuration of the transponder of FIG. 5.
Figure 7:
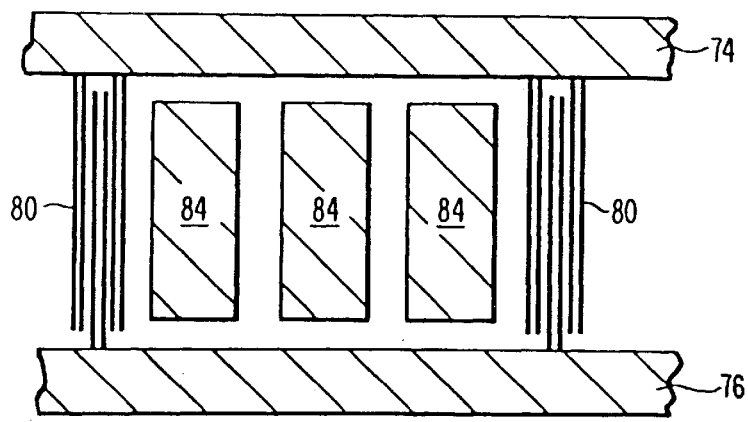
FIG. 7 is a plan view, in greatly enlarged scale, of a portion of the transponder configuration shown in FIG. 6.
Figure 8:
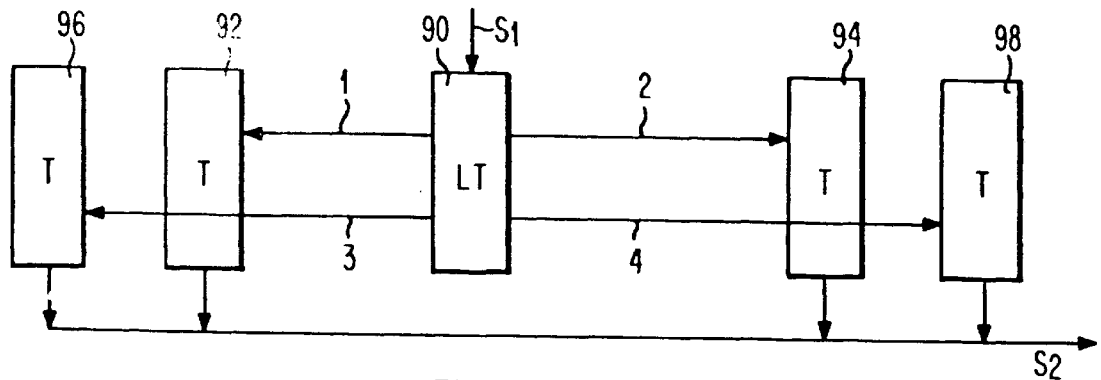
FIGS. 8–12 are representational diagrams, in plan view, of a various configurations of the transponder of FIG. 5.
Figure 9:
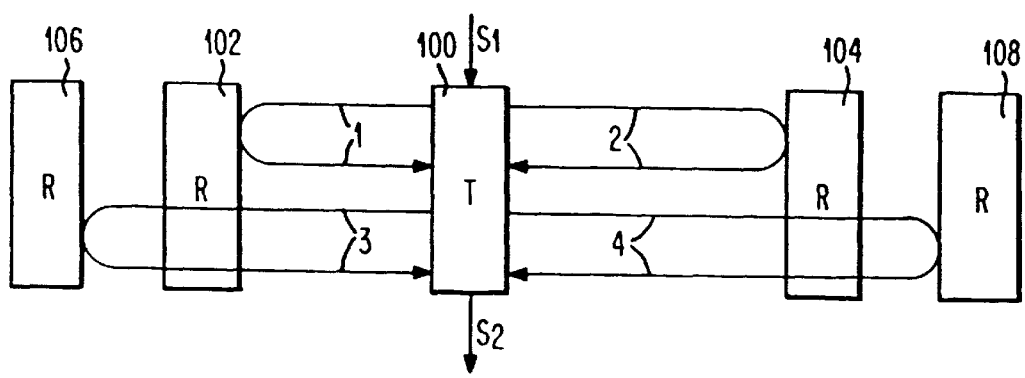
Figure 10:
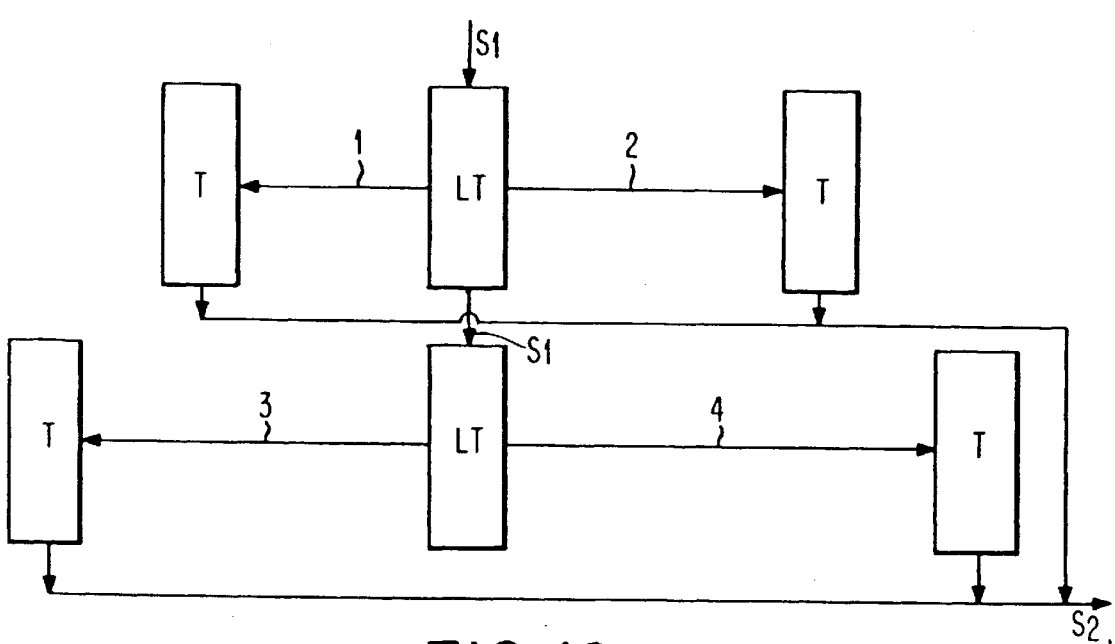
Figure 11:
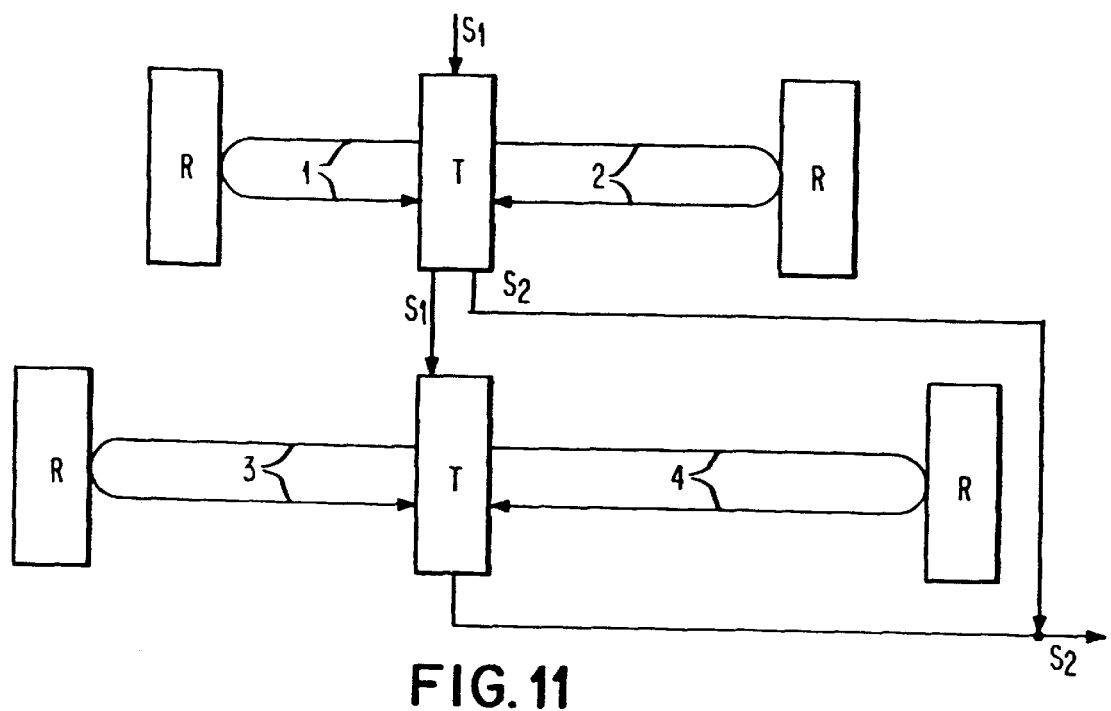
Figure 12:
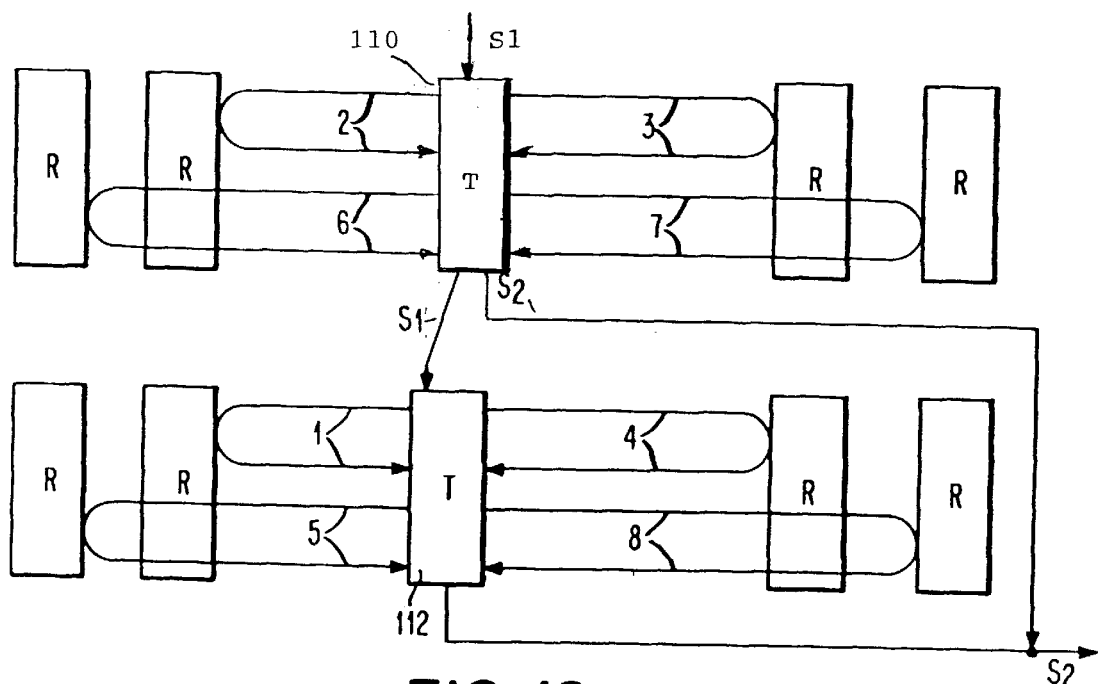

An integrator, which is a two pole R-C low pass filter, as shown in FIG. 19A2, having a two time-constants of about 10 $\mu$S, and a frequency cutoff of about 100 kHz, receives the output of the mixer 208, and thus produces a filtered output representing the relative phase for each excitation frequency 246. The integrator output is samples by a sample hold amplifier (not shown) after the transients have abated and the signal has settled, for example four to five timeconstants of the filter, e.g., 40–50 $\mu$S.

Figure 19B:
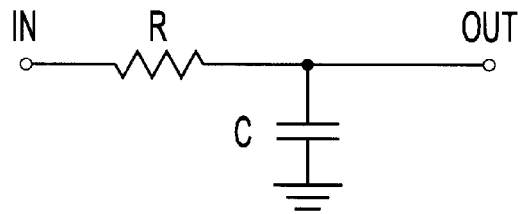
Figure 19B:
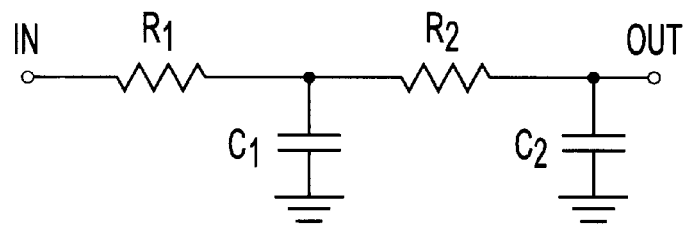
Figure 19B:
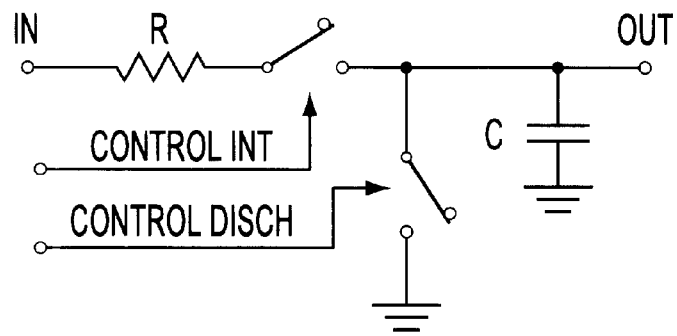
Figure 20:
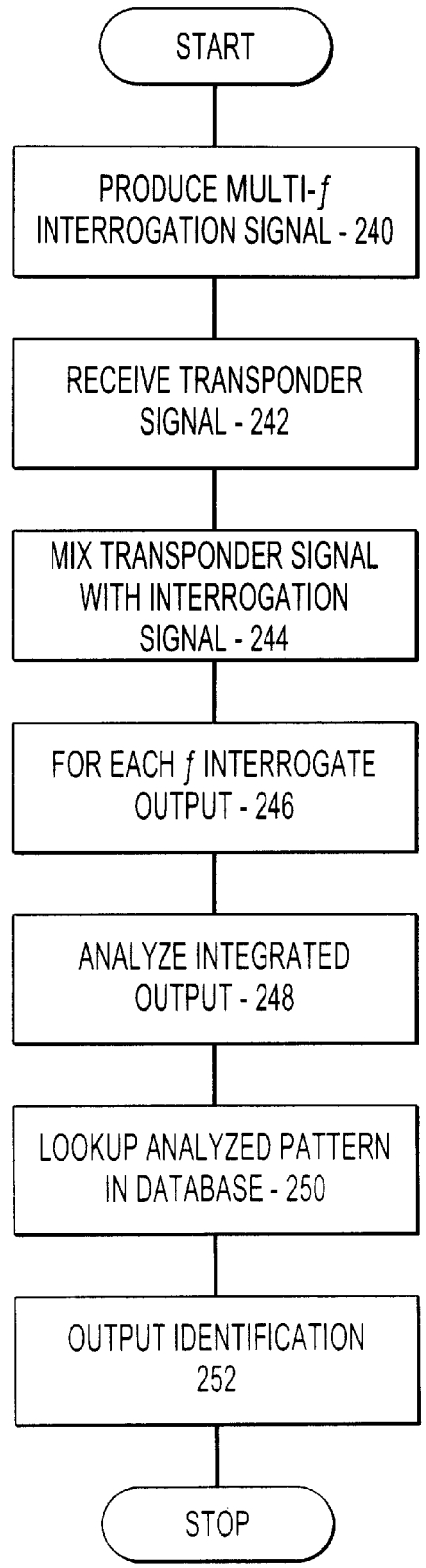
FIG. 20 is a flow chart showing the operation sequence of a system according to the present invention.

Of course, the integrator 210 may be more or less complex. It may be a single pole R-C filter, as shown in FIG. 19A1, an active filter (not shown) or digitally controlled integrator having a controlled integration period, as shown in FIG. 19B, or other type.

The duration of each hop of the signal generator 200 is longer than the longest delay in a transponder 204 as well as the travel delay. Thus, where a maximum delay within a transponder 204 is less than about 10 $\mu$S, a stationary frequency dwell period is greater than 10 $\mu$S; practically, this dwell period may be much greater.

Figure 17:
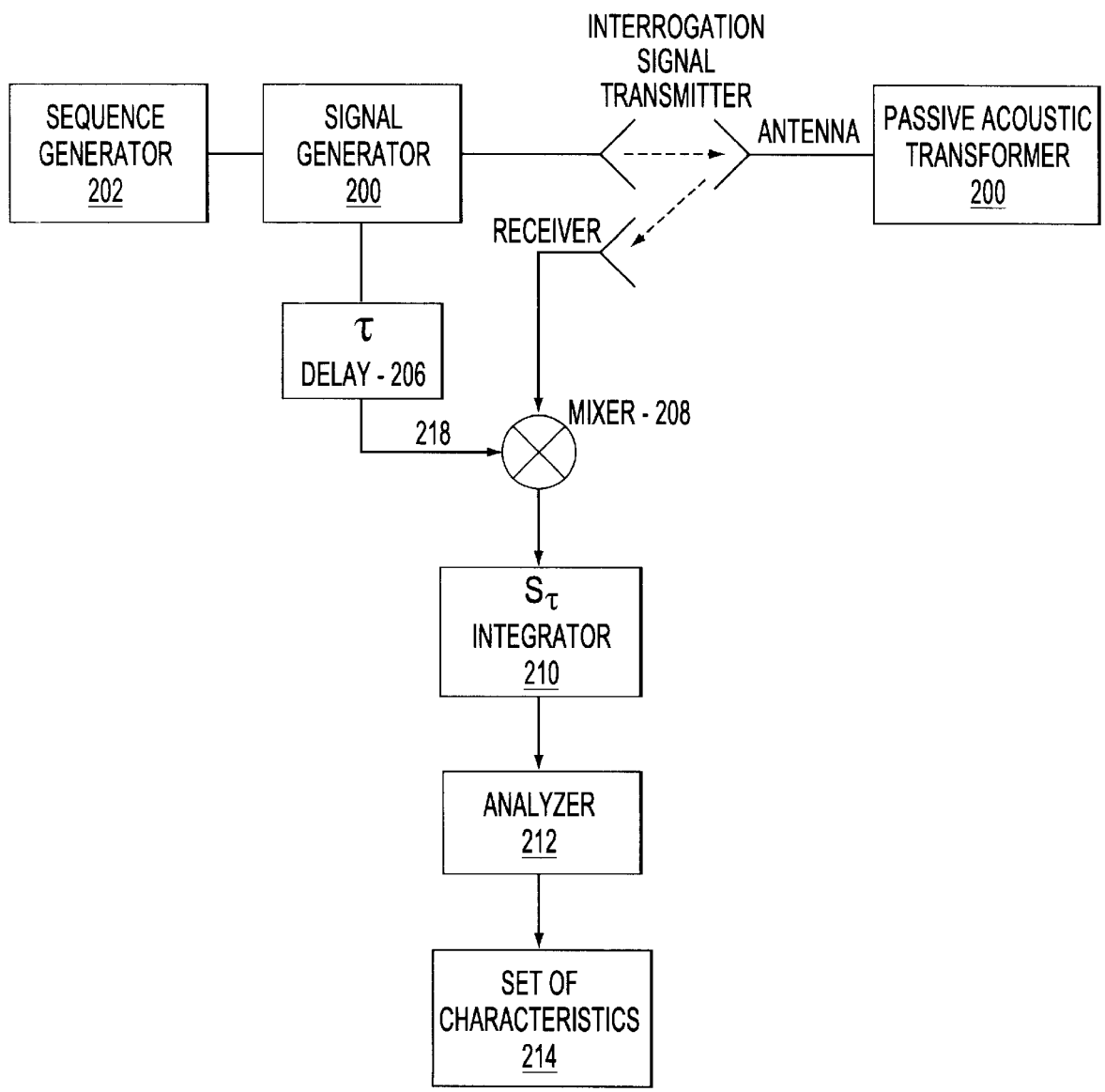
FIG. 17 is a block diagram of a first embodiment of an acoustic transponder interrogation system according to the present invention.
Figure 18:
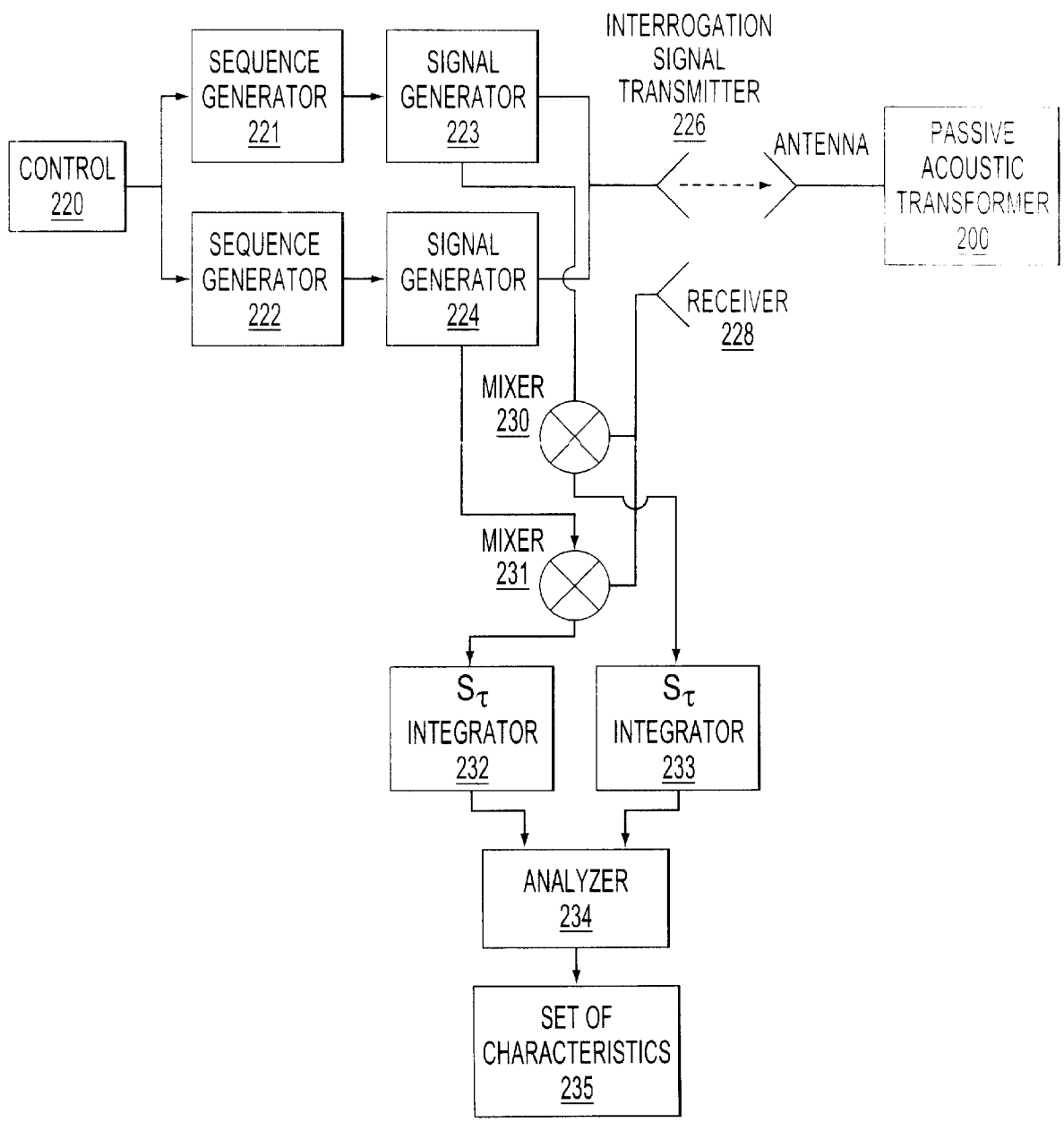
FIG. 18 is a block diagram of a second embodiment of an acoustic transponder interrogation system according to the present invention, having a plurality of signal generators.

In the preferred embodiment, a single frequency is emitted as the interrogation signal at any time; however, a plurality of such frequencies may be emitted simultaneously or concurrently, as shown in FIG. 18. In that case, the receiver system may selectively decode one of the frequencies at any given time, or a parallel process established with a plurality of mixers and integrators. Thus, in the later case, a system as shown in FIG. 18 is provided. A control 220 controls a pair of sequence generators 221, 222, which in turn control a pair of signal generators 223, 224 which are, for example, digitally controlled oscillators. The outputs of the the signal generators 223, 224 are summed and emitted from a transmitter 226, and interact with a transponder 204. A receiver 228, receives a modified interrogation signal, which is then fed to a pair of mixers 230, 231, for demodulation with signals corresponding to the individual signal components of the interrogation signal. The outputs of the mixers 230, 231 are individually integrated in integrators 232, 233, and the outputs captured and analyzed in the analyzer 234. The analyzer, after acquiring sufficient data and optionally performing consistency checks, outputs a set of characteristics 235 of the transponder 204. In comparison to the system shown in FIG. 17, the system according to FIG. 18 will obtain sufficient data for an output about twice as fast. In like manner, a greater number of channels may be simultaneously operative, up to the number of different frequencies.

The demodulator produces a resulting low frequency signal, resulting from homodyne demodulation of the interrogation signal with the transponder signal at the same frequency, thus producing a signal with an amplitude related to the average phase relation of the signals entering the mixer. This amplitude is determined, for example every 125 µS (8 kHz), with frequency hops occurring at this same rate. Because of the differences in the transponder signal due the fixed nature of internal delays and the changing interrogation frequency, the phase at each frequency hop provides a datapoint for analyzing the various delays within the transponder.

Figure 16:
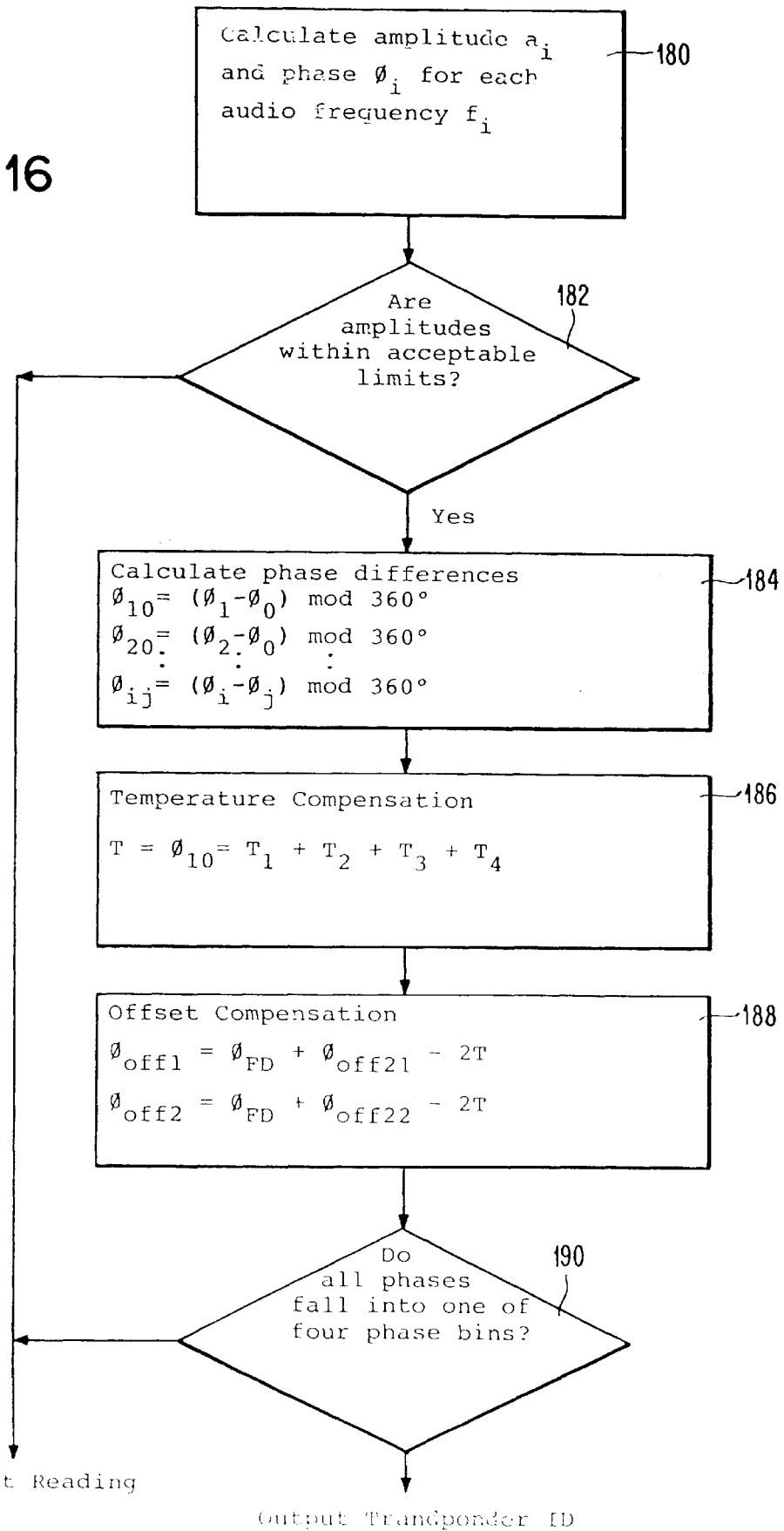
FIG. 16 is a flow diagram showing the order of calculations carried out by the signal processor and microprocessor in the system of FIG. 1.

In performing an analysis of the transponder signal 248, a number of compensations and corrections may be made. For example, the round trip signal delay may be normalized, yielding an estimate of distance by a time of arrive technique. Likewise, any Doppler shift in the signal may be determined and compensated, allowing an indication of relative speed. This later correction produces a relative frequency shift of the transponder signal with respect to the interrogation signal. This frequency shift, however, is typically of a relatively low frequency, below the 8 kHz frequency hopping rate and therefore introduces only small errors, which may be compensated in the analysis. Likewise, other potential causes for variations from the nominal delay periods of a transponder, including temperature changes, mask variations, manufacturing variations and random variations may also be compensated in the analysis. Since the determined degrees of freedom correspond to delays, the correction scheme is essentially as shown in FIG. 16 of the prior art.

The relative phase data output from the integrator is stored in memory and analyzed under control of the microprocessor, preferably by a dedicated digital signal processor (DSP). This DSP determines the delay coefficients of the transponder, which correspond to the degrees of freedom, and applies corrections and compensations as necessary. The DSP may also perform consistency checking of each data point, based on the redundant information from the larger number of datapoints available than are minimally necessary, excluding from analysis those which are likely to represent artifacts or interference. The microprocessor then receives the delay coefficients, which are used to access a database 250, allowing identification of the transponder, which is then output 252. Typically, the database also stores an associated with an object, such as baggage, cargo, automobiles, or the like, which may also be accessed from the database.

The analyzer thus evaluates a set of simultaneous equations relating the integrated phase-responses to the characteristic set of signal perturbations of the passive acoustic transponder, compensating the evaluated degrees of freedom for predetermined variances, evaluating each integrated phase-response for consistency with a set of remaining integrated phase responses, and producing an output of the delay coefficients.

There has thus been shown and described a novel method for interrogating a passive acoustic wave transponder with a frequency hopping interrogation wave, and a method and system for analyzing a transponder signal therefrom. Many changes, modifications variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A system for interrogating a passive acoustic transponder, producing a transponder signal having characteristic set of signal perturbations in response to an interrogation signal, comprising:

(a) a signal generator, producing an interrogation signal having a plurality of differing frequencies;

(b) a receiver, for receiving the transponder signal;

(c) a mixer, for mixing said transponder signal with a signal corresponding to said interrogation signal, to produce a mixed output;

(d) an integrator, integrating said mixed output to define an integrated phase-response of the received transponder signal; and (e) an analyzer, receiving a plurality of integrated phase-responses corresponding to said plurality of differing frequencies, for determining the characteristic set of signal perturbations of the passive acoustic transponder.

2. The system according to claim 1, wherein the characteristic set of signal perturbations comprises an acoustic reflection pattern.

3. The system according to claim 1, wherein the characteristic set of signal perturbations comprises of phase shifts.

4. The system according to claim 1, wherein said interrogation signal comprises a frequency band having a bandwidth of less than about 5% and having a center frequency in the range of between about 300 MHz to about 30 GHz.

5. The system according to claim 1, wherein said interrogation signal comprises a frequency in a band between about 800 MHz and 1.3 GHz and having a bandwidth of between about 1–3%.

6. The system according to claim 1, wherein said interrogation signal comprises a frequency hopping spread spectrum signal.

7. The system according to claim 1, wherein the characteristic set of signal perturbations comprises a pattern selected from a signal perturbation space having a plurality of degrees of freedom, said interrogation signal having a number of said plurality of differing frequencies no less than the number of degrees of freedom.

8. The system according to claim 1, wherein said plurality of differing frequencies are generated sequentially.

9. The system according to claim 1, wherein at least two of said plurality of differing frequencies are generated simultaneously.

10. The system according to claim 1, wherein said interrogation signal has a pseudorandom sequence of differing frequencies which repeats after a finite duration.

11. The system according to claim 1, wherein the characteristic set of signal perturbations comprises a pattern selected from a signal perturbation space having a plurality of degrees of freedom, said interrogation signal having a number of said plurality of differing frequencies between about 2 to 8 times the number of degrees of freedom.

12. The system according to claim 1, wherein the characteristic set of signal perturbations comprises a pattern selected from a signal perturbation space having a plurality of degrees of freedom, said interrogation signal having a number of said plurality of differing frequencies at least 2 times the number of degrees of freedom.

13. The system according to claim 1, wherein said plurality of differing frequencies are about evenly spaced across a band.

14. The system according to claim 1, wherein said signal generator comprises a digitally controlled oscillator.

15. The system according to claim 1, wherein said signal corresponding to said interrogation signal is delayed with respect to said interrogation signal.

16. The system according to claim 1, wherein said mixer homodynes said transponder signal with a signal corresponding to said interrogation signal to produce, in a steady state condition, a signal whose amplitude corresponds to a relative phase difference between said transponder signal and said signal corresponding to said interrogation signal.

17. The system according to claim 1, wherein said mixer comprises a double balanced mixer.

18. The system according to claim 1, wherein said integrator comprises a low pass filter.

19. The system according to claim 1, wherein said integrator integrates said mixed output over a predetermined period.

20. The system according to claim 1, wherein said integrated phase-response is represented as a scalar value.

21. The system according to claim 1, wherein said integrator interrogation signal has a plurality of successive states, each state having a predetermined period, said integrator comprising a low pass filter having a main time constant of less than about 25% of said period.

22. The system according to claim 1, wherein said characteristic set of signal perturbations of said transponder has a maximum significant timeconstant of less than about 5 $\mu$S and comprises a pattern selected from a signal perturbation space having about 16 degrees of freedom, said transponder integrator interrogation signal being a pseudorandom sequence frequency hopping signal having about 128 successive different frequencies before repetition, each state having a predetermined period of about 125 $\mu$S.

23. The system according to claim 1, wherein said interrogation signal comprises a frequency hopping spread spectrum signal having a dwell period, the characteristic set of signal perturbations of said transponder having a maximum significant timeconstant of less than about 10% of said dwell period, said integrator being a low pass filter having a cutoff frequency of less than the reciprocal of the maximum significant timeconstant of the transponder.

24. The system according to claim 1, wherein said integrator comprises a low pass filter having at least two poles in its transfer function.

25. The system according to claim 1, wherein said analyzer evaluates a set of simultaneous equations relating said integrated phase-responses to the characteristic set of signal perturbations of the passive acoustic transponder.

26. The system according to claim 1, wherein the characteristic set of signal perturbations comprises a pattern selected from a signal perturbation space having a plurality of degrees of freedom, said interrogation signal having a number of said plurality of differing frequencies no less than the number of degrees of freedom, said analyzer solving simultaneous equations for evaluating the degrees of freedom, said analyzer compensating said evaluated degrees of freedom for predetermined variances, evaluating each integrated phase-responded for consistency with a set of remaining integrated phase responses, and outputting a compensated, self-consistent data set corresponding to said evaluated degrees of freedom.

27. A method for interrogating a passive acoustic transponder, producing a transponder signal having characteristic set of signal perturbations in response to an interrogation signal, comprising:

(a) producing an interrogation signal having a plurality of differing frequencies;

(b) receiving the transponder signal from the passive acoustic transponder;

(c) mixing the transponder signal with a signal corresponding to the interrogation signal, to produce a mixed output;

(d) integrating the mixed output to define an integrated phase-response of the received transponder signal; and (e) analyzing a plurality of integrated phase-responses corresponding to the plurality of differing frequencies, to determine the characteristic set of signal perturbations of the passive acoustic transponder.

28. A method for identifying a passive acoustic transponder, having a set of characteristic signal perturbations selected from a signal perturbation space having a plurality of degrees of freedom, and producing a perturbed signal in response to an interrogation, comprising the steps of:

(a) interrogating the passive acoustic transponder with a frequency hopping spread spectrum signal, having a sequence of a plurality of different frequencies, and a stationary frequency dwell period;

(b) receiving and demodulating the perturbed signal based on a representation of the frequency hopping spread spectrum signal;

(c) determining an average phase of the demodulated perturbed signal during a plurality of dwell periods; and (d) analyzing the average phase from the plurality of dwell periods to determine the values of the plurality of degrees of freedom.

29. The method according to claim 28, further comprising the steps of:

(e) providing a plurality of a passive acoustic transponders;

(f) storing in a database an association of an identification of each passive acoustic transponder with values identifying the values of the plurality of degrees of freedom; and (g) based on the determined values of the plurality of degrees of freedom, retrieving an identification of a passive acoustic transponder from the database.

30. The method according to claim 28, further comprising the steps of providing a plurality of passive acoustic transponders, each physically associated with an object; storing in a database an association of each passive acoustic transponder with the object, including the values identifying the values of the plurality of degrees of freedom; and based on the determined values of the plurality of degrees of freedom, retrieving an identification of an object associated with the transponder from the database.

31. A system for determining characteristics of an acoustic wave transponder, producing an transponder signal having characteristic set of signal perturbations in response to an interrogation signal and an internal reference, comprising:

(a) an interrogation signal generator, producing a non-stationary interrogation signal hopping to a plurality of differing frequencies;

(b) a receiver, for receiving the transponder signal;

(c) a demodulator, for demodulating a signal dependent on characteristics of the transponder from said interrogation signal, to produce a demodulated output;

(d) an phase detector, detecting a phase relationship of said demodulated output with respect to the reference; and (e) an analyzer, sequentially receiving a plurality of detected phase relationships corresponding to said plurality of differing frequencies, for determining the characteristic set of signal perturbations of the acoustic wave transponder.

32. The system according to claim 31, wherein said non-stationary interrogation signal hops to a plurality of differing frequencies according to a pseudorandom sequence.

* * * * *